(12) United States Patent
Tagawa

(10) Patent No.: US 7,996,506 B2
(45) Date of Patent: Aug. 9, 2011

(54) SETTING MANAGEMENT SYSTEM AND SETTING MANAGEMENT PROGRAM

(75) Inventor: Norio Tagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1056 days.

(21) Appl. No.: 11/237,742

(22) Filed: Sep. 29, 2005

(65) Prior Publication Data
US 2006/0069807 A1    Mar. 30, 2006

(30) Foreign Application Priority Data

Sep. 30, 2004   (JP) ................................ 2004-289130

(51) Int. Cl.
*G06F 15/173* (2006.01)
(52) U.S. Cl. ......................... 709/223; 709/224; 709/221
(58) Field of Classification Search .................. 709/223
See application file for complete search history.

(56) References Cited

U.S. PATENT DOCUMENTS

| | | | | |
|---|---|---|---|---|
| 4,539,992 A * | 9/1985 | Calfee et al. | ................... | 607/32 |
| 5,745,765 A * | 4/1998 | Paseman | ..................... | 717/107 |
| 6,334,158 B1 * | 12/2001 | Jennyc et al. | ................. | 719/328 |
| 7,020,844 B2 * | 3/2006 | Trevino et al. | ................ | 715/772 |
| 7,093,283 B1 * | 8/2006 | Chen et al. | ........................ | 726/6 |
| 7,200,663 B2 * | 4/2007 | Arens et al. | ................... | 709/226 |
| 2003/0037133 A1 * | 2/2003 | Owens | ......................... | 709/223 |
| 2003/0061320 A1 * | 3/2003 | Grover et al. | ................. | 709/222 |
| 2003/0095144 A1 * | 5/2003 | Trevino et al. | ................ | 345/764 |
| 2003/0095150 A1 * | 5/2003 | Trevino et al. | ................ | 345/810 |
| 2004/0103312 A1 * | 5/2004 | Messerges et al. | ........... | 713/201 |

FOREIGN PATENT DOCUMENTS

| | | |
|---|---|---|
| JP | 2001-034434 | 2/2001 |
| JP | 2001034434 | 2/2001 |
| JP | 2002-095033 | 3/2002 |

OTHER PUBLICATIONS

Microsoft, "Delivery Guide, Microsoft Windows Small Business Server 2003", Jun. 13, 2003, Microsoft, all pages, http://trjpIg.bay.livefilestore.com/y1pesG4JliWBY66axfHeaulZ0RSrPXsnngQhHQAcaSmBofVjEcKUR9PSUdnzkYmkatTAC7FxK2pyY8.*

* cited by examiner

*Primary Examiner* — Yasin Barqadle
*Assistant Examiner* — Hua Fan
(74) *Attorney, Agent, or Firm* — Banner & Witcoff, Ltd.

(57) ABSTRACT

When a user of a PC of a setting management system designates an IP address that should be deleted from IP addresses that have been set for a management target device, the PC presumes that another parameter should be changed together with the designated IP address based on a setting function that was used for setting the IP address. Also, the PC informs the user about the existence of such a parameter by displaying a message on a display unit that another parameter closely related to the IP address (designated by the user to be changed) should also be changed in conjunction with the IP address.

29 Claims, 25 Drawing Sheets fd01::2c0:4fff:fe68:cccc

FIG. 10

Request for the change is denied since this address has been set automatically.

OK

SETTING MANAGEMENT SYSTEM AND SETTING MANAGEMENT PROGRAM

INCORPORATION BY REFERENCE

This application claims priority from Japanese Patent Application No. 2004-289130, filed on Sep. 30, 2004. The entire subject matter of the application is incorporated herein by reference.

BACKGROUND

1. Technical Field

The present invention relates to a setting management system for managing communication parameters which are necessary for letting a device function as a communication device capable of data communication via a network according to a prescribed communication protocol.

2. Description of Related Art

In order to enable a network device (hereinafter simply referred to as a "device") to execute data communication via a network, various parameters such as identification information on the device (IP address) and identification information on a gateway server (the so-called "default gateway") and a DNS (Domain Name System) server (hereinafter collectively referred to as "communication parameters") have to be set properly for the device. The setting of the communication parameters is generally implemented by various setting functions, including manual setting (setting by manual operation by a user) and automatic setting (setting according to a prescribed communication protocol such as DHCP (Dynamic Host Configuration Protocol) and NDP (Neighbor Discovery Protocol)).

The communication parameters which have been set by such setting functions can be changed arbitrarily to suit the status of use of the device. However, normal operation of the device can be negatively impacted in some cases if other parameters regarding a particular setting function are not changed properly together with the communication parameters.

For example, in cases where the setting of a communication parameter is realized by the automatic setting, a validity period (lease period) is generally assigned to the communication parameter set as above, and the communication parameter is updated to a new parameter at every lease period. If the communication parameter is changed by the manual setting function in the state with the automatic setting function enabled, the communication parameter will be updated automatically at the expiration of the validity period even if data communication is possible during the validity period, by which data communication which has been executed normally can become impossible after the expiration. Specifically, if identification information on the device that has been changed properly by the user is updated by the automatic setting function with timing unexpected by the user, data reception which has been possible up to that point can become impossible. Also data reception can become impossible if identification information on the gateway server or the DNS server that has been changed properly by the user is updated by the automatic setting function with unexpected timing.

A technique for avoiding the above problem has been proposed recently in Japanese Patent Provisional Publication No. 2001-34434 (paragraph No. 0043, for example). In the technique, when a manual operation is performed by the user to change a functional parameter (e.g. information indicating validity/invalidity of DHCP) regarding a particular setting function (into information indicating validity of DHCP, for example), the device checks whether the alteration involves a factor negatively impacting normal operation (e.g. disabling of an I/F operating under DHCP) and outputs a message (displays the message on its control panel) when there exists such a factor.

With the above technique, when a manual operation for changing a functional parameter regarding a particular setting function is performed by the user, an expected disablement of normal operation can be reported to the user. Further, the user is allowed to change other related parameters (e.g. a parameter indicating enabling/disabling of the I/F) together with the functional parameter, as described in Japanese Patent Provisional Publication No. 2001-34434.

However, in the above technique, the parameters that are referred to when checking for a factor negatively impacting the normal operation of the device are not communication parameters but parameters regarding the setting of hardware configuration (I/F, etc.) of the device even though the functional parameters are parameters regarding the setting functions (manual setting, automatic setting, etc.) for the setting the communication parameters. In other words, the above technique is not capable of informing the user that both a functional parameter and a communication parameter should be changed in conjunction with each other even if the functional parameter and the communication parameter are closely related to each other.

Considering that the communication parameters can be changed more frequently than the hardware configuration of a device, informing the user that a functional parameter and a communication parameter should be changed together as above can be regarded as a matter of more importance and necessity than informing the user that there exists a factor negatively impacting the normal operation based on the hardware configuration of the device. Therefore, a technique is desired that is capable of informing the user that a functional parameter and a communication parameter should be changed in conjunction with each other.

SUMMARY

Aspects of the present invention are advantageous in that a setting management system may be provided that is capable of informing the user that a functional parameter and a communication parameter should be changed in conjunction with each other.

BRIEF DESCRIPTION OF THE ACCOMPANYING DRAWINGS

FIG. 10 is a schematic diagram showing data structure of a prohibited router list in accordance with illustrative aspects of the invention.

DETAILED DESCRIPTION

General Overview

Figure 1:
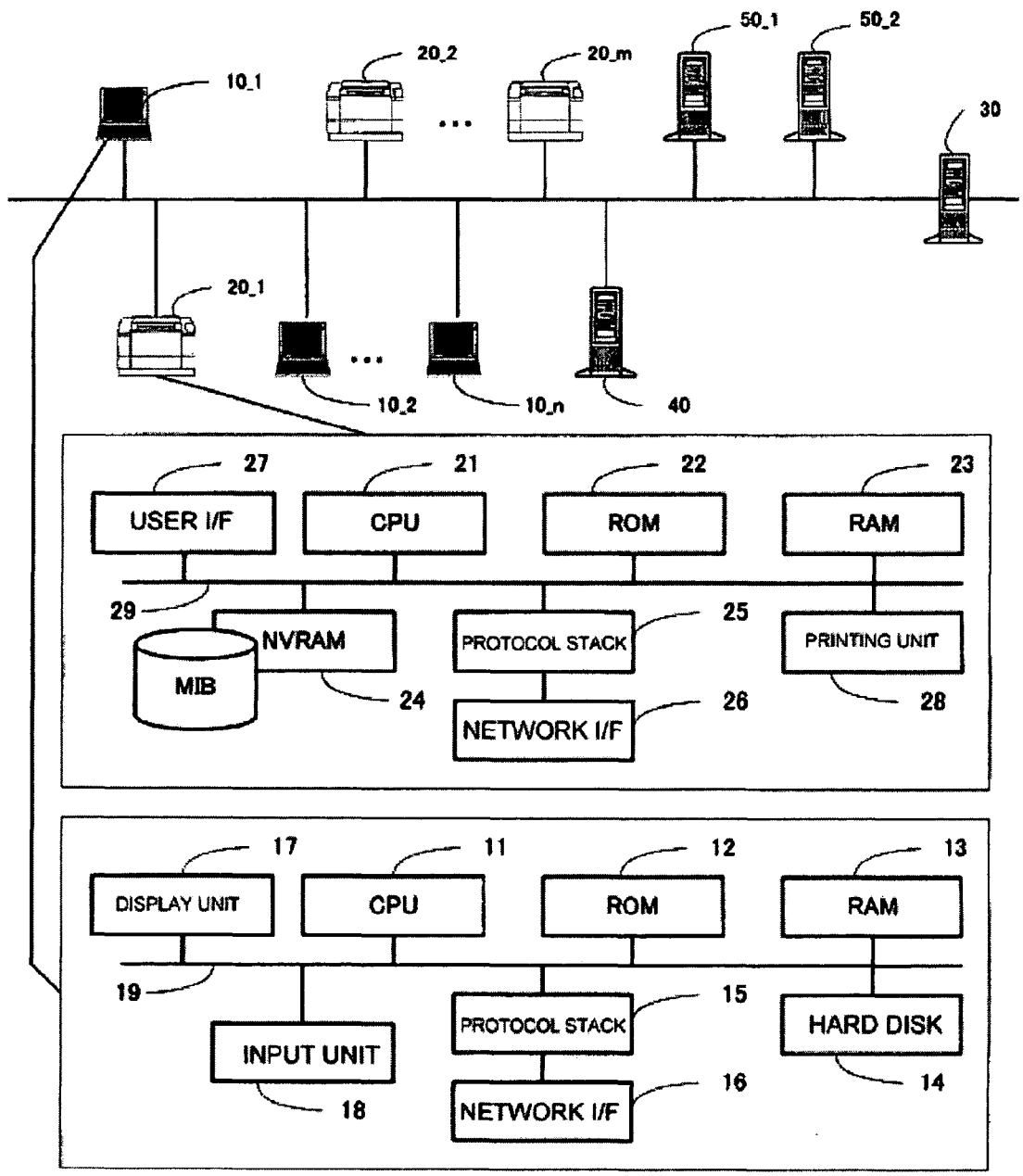
FIG. 1 is a block diagram showing a setting management system in accordance with illustrative aspects of the present invention.

It is noted that various connections are set forth between elements in the following description. It is noted that these connections in general and unless specified otherwise, may be direct or indirect and that this specification is not intended to be limiting in this respect.

In accordance with an illustrative aspect of the present invention, there is provided a computer program product storing computer-readable instructions that cause at least a device included in at least one device connected to a network to execute a setting management process for managing communication parameters of a management target device in the network. The communication parameters necessary for the management target device to be capable of data communication via the network according to a prescribed communication protocol can be set by setting functions while registering a setting function used for setting each communication parameter and associating the setting function with the communication parameter. The setting management process includes a change designation step that allow a user to designate a communication parameter that should be changed out of the communication parameters of the management target device; a parameter presumption step that presumes a functional parameter relating to a setting function should be changed together with the communication parameter designated in the change designation step based on the setting function that has been registered as being associated with the communication parameter; and an existence information step that informs the user that there exists a functional parameter that should be changed together with the designated communication parameter responsive to presuming that a functional parameter should be changed.

With the device controlled by the computer program product, when a communication parameter that should be changed is designated by the user, a functional parameter that should be changed together with the communication parameter is presumed based on the setting function associated with the communication parameter (i.e. the setting function used for setting the communication parameter) and the user is informed of the existence of such a functional parameter, by which the device can inform the user that the communication parameter designated to be changed and the functional parameter closely related to the communication parameter should be changed in conjunction with each other.

In the change designation step of allowing the user to designate a communication parameter that should be changed (out of the communication parameters that can be set to the management target device), the description "that should be changed" can include "that should be deleted" (from communication parameters already set for the management target device). When a particular communication parameter is designated by the user as one that should be deleted, the user believes that the communication parameter is unnecessary, and thus it is possible to presume that the user believes that there is no problem even if the setting function used for setting the communication parameter is disabled, or that the user desires to enable a setting function other than the setting function used for setting the communication parameter.

Therefore, when a communication parameter "that should be deleted" is designated from the already-set communication parameters, it is possible to inform the user that setting communication parameters by the setting function used for setting the designated communication parameter should be disabled, or that setting communication parameters by a setting function other than the setting function used for setting the designated communication parameter should be enabled.

For this purpose, the computer program product may be configured as below.

When one of the communication parameters is designated by the user in the change designation step as a communication parameter that should be deleted, the parameter presumption step may presume a functional parameter indicating whether to enable or disable the setting of communication parameters by part or all of the setting function that has been registered as being associated with the designated communication parameter. The existence information step informs the user based on the functional parameter presumed by the parameter presumption step that the setting of communication parameters by part or all of the setting function corresponding to the functional parameter should be disabled or that the setting of communication parameters by a setting function other than part or all of the setting function corresponding to the functional parameter should be enabled.

With the above configuration, when the user designates a communication parameter as one that should be deleted, the device can inform the user that the setting function used for setting the designated communication parameter should be disabled, or that a setting function other than the setting function used for setting the designated communication parameter should be enabled, by presuming the intention of the user.

In this configuration, the parameter presumption step may be a step for presuming a parameter, indicating whether to enable or disable the setting of communication parameters by a setting function, as the functional parameter. The setting function corresponding to the functional parameter presumed by the parameter presumption step may be restricted to the setting function that has been registered as being associated with the communication parameter designated by the user in the change designation step.

Incidentally, the "setting functions" can be classified into some types such as a type of function of setting a communication parameter manually inputted by the user to the management target device, a type of function of setting a communication parameter obtained from another device to the management target device, etc. When one of the types includes two or more functions, that is, when there exists a setting function similar to the setting function that has been registered as being associated with the communication parameter designated by the user in the change designation step, the similar setting function may also be included in (regarded as) the setting function corresponding to the functional parameter presumed by the parameter presumption step.

Disabling the setting of communication parameters by the similar setting function causes few problems and if anything, such disabling is expected to be more in conformity with the intention of the user. Therefore, the computer program product may be configured as below.

The parameter presumption step may presume a functional parameter indicating whether to enable or disable the setting of communication parameters by a setting function similar to the setting function that has been registered as being associated with the communication parameter designated in the change designation step.

With the above configuration, when the user designates a communication parameter as one that should be deleted, the device can inform the user that a setting function similar to the setting function used for setting the designated communication parameter should be disabled.

Incidentally, the description "the setting of communication parameters by all of the setting function" in the above explanation of the existence information step means the setting (of communication parameters by the setting function) itself. The description "the setting of communication parameters by part of the setting function" means, for example, setting part of a communication parameter by the setting function, setting a communication parameter based on a parameter obtained from a particular device (or obtained from a device other than that particular device) when the setting function is a function of setting a communication parameter obtained from another device (or a function of setting a communication parameter generated based on a parameter obtained from another device), etc.

In the latter case where "the setting of communication parameters by part of the setting function" is applied to "the setting a communication parameter obtained from another device", when a particular communication parameter is designated by the user as one that should be deleted, the user believes that the communication parameter is unnecessary, and thus it is possible to presume that the user believes that there is no problem even if subsequent settings of communication parameters from a device as the source of the particular communication parameter are disabled. Therefore, the existence information step may be configured to inform the user that setting communication parameters obtained from a particular device should be disabled, for example.

Therefore, the computer program product may be configured as below.

The setting functions may include a function of setting a communication parameter obtained from another device connected via the network. When the setting function that has been registered as being associated with the communication parameter designated in the change designation step is the function of setting a communication parameter obtained from another device, the parameter presumption step presumes a functional parameter indicating whether to enable or disable the setting of communication parameters obtained from the device as the source of the designated communication parameter by the function. The existence information step informs the user when necessary based on the functional parameter presumed by the parameter presumption step that the setting of communication parameters obtained from the device as the source of the designated communication parameter by the function associated with the designated communication parameter should be disabled.

With the above configuration, when the user designates a communication parameter as one that should be deleted, if the setting function used for the setting of the designated communication parameter is the function of setting a communication parameter obtained from another device, it is possible to inform the user that the setting of communication parameters obtained from the "another device" (the "particular device") by the function should be disabled.

Incidentally, in cases where there are multiple devices as sources of communication parameters in regard to the same setting function, it is possible to register information capable of identifying a device as the source of each communication parameter (when the communication parameter and the setting function are registered as being associated with each other) so that the setting of communication parameters from the registered device can be prohibited later.

The description "that should be changed" in the explanation of the change designation step can also mean a new communication parameter "that should be added". When a particular communication parameter is designated by the user as one that should be added, the user desires to use the communication parameter, and thus it is possible to presume that the user believes that the setting function used for the setting of the communication parameter should be enabled, or that the user believes that there is no problem even if a setting function other than the setting function used for the setting of the communication parameter is disabled. Therefore, when a communication parameter "that should be added" is designated, it is possible to inform the user that setting communication parameters by the setting function used for the setting of the designated communication parameter should be enabled, or that setting communication parameters by a setting function other than the setting function used for setting the designated communication parameter should be disabled.

For this purpose, the computer program product may be configured as below.

The change designation step may allow the user to designate at least part of a communication parameter that should be additionally set to the management target device and a setting function. The setting management process further includes a setting registration step, executed when a communication parameter and a setting function are designated in the change designation step, of setting the designated communication parameter to the management target device while registering the setting function and associating the setting function with the communication parameter. When a communication parameter that should be additionally set to the management target device and a setting function are designated by the user in the change designation step, the parameter presumption step presumes a functional parameter indicating whether to enable or disable the setting of communication parameters by part or all of the designated setting function. The existence information step informs the user when necessary based on the functional parameter presumed by the parameter presumption step that setting communication parameters by a setting function other than part or all of the setting function corresponding to the functional parameter should be disabled or that setting communication parameters by part or all of the setting function corresponding to the functional parameter should be enabled.

With the above configuration, when the user designates a communication parameter and a setting function that should be added (additionally set), the device can inform the user that the setting function used for the setting of the designated communication parameter should be enabled, or that a setting function other than the setting function used for the setting of the designated communication parameter should be disabled, by presuming the intention of the user.

In this configuration, the parameter presumption step is a step for presuming a parameter, indicating whether to enable or disable the setting of communication parameters by a setting function, as the functional parameter. The setting function corresponding to the functional parameter presumed by the parameter presumption step may be restricted to the setting function designated by the user together with the communication parameter in the change designation step.

Incidentally, the "setting functions" can be classified into some types such as a type of function of setting a communication parameter manually inputted by the user to the management target device, a type of function of setting a communication parameter obtained from another device to the management target device, etc. When one of the types includes two or more functions, that is, when there exists a setting function similar to the setting function designated by the user together with the communication parameter in the change designation step, the similar setting function may also be included in (regarded as) the setting function corresponding to the functional parameter presumed by the parameter presumption step.

Enabling the setting of communication parameters by the similar setting function causes few problems and if anything, such enabling is expected to be more in conformity with the intention of the user. Therefore, the computer program product may be configured as below.

The parameter presumption step may presume a functional parameter indicating whether to enable or disable the setting of communication parameters by a setting function similar to the setting function designated in the change designation step.

With the above configuration, when the user designates a communication parameter and a setting function that should be added, the device can inform the user that a setting function similar to the designated setting function should be enabled.

As mentioned above, the description "the setting of communication parameters by part of the setting function" means, for example, setting part of a communication parameter by the setting function, setting a communication parameter based on a parameter obtained from a particular device when the setting function is a function of setting a communication parameter obtained from another device, etc.

In the case where "the setting of communication parameters by part of the setting function" is applied to "the setting a communication parameter obtained from another device", when a particular communication parameter is designated by the user as one that should be added, the user desires to use the communication parameter, and thus it is possible to presume that the user believes that subsequent settings of communication parameters from a device as the source of the particular communication parameter should be enabled. Therefore, the existence information step may be configured to inform the user that the setting of communication parameters obtained from a particular device should be enabled, for example.

Therefore, the computer program product may be configured as below.

The setting functions may include a function of setting a communication parameter obtained from a source device connected to the management target device via the network. When the setting function designated in the change designation step together with the communication parameter is the function of setting a communication parameter obtained from a source device connected to the management target device via the network, the parameter presumption step presumes a functional parameter indicating whether to enable or disable the setting of communication parameters obtained from the source device by the setting function. The existence information step informs the user when necessary based on the functional parameter presumed by the parameter presumption step that the setting of communication parameters obtained from the source device by the setting function should be enabled.

With the above configuration, when the user designates a communication parameter and a setting function that should be added, if the setting function used for setting the designated communication parameter is the function of setting a communication parameter obtained from another device (source device), it is possible to inform the user that setting communication parameters obtained from the "another device" (source device) by the function should be enabled.

Incidentally, in cases where there are multiple devices as sources of communication parameters in regard to the same setting function, it is possible to let the user designate information capable of identifying a device as the source for the setting function in the change designation step so that setting communication parameters from the designated device will be enabled.

By the way, the "communication parameters" are parameters necessary for permitting the management target device to be capable of data communication via the network according to a prescribed communication protocol. For example, the communication parameters of the management target device may include a parameter indicating part or all of identification information assigned to a device connected to the network.

With the above configuration, part or all of identification information on a device can be set to the management target device. The "identification information assigned to a device" can include identification information assigned to the management target device itself, identification information assigned to a relaying device (router, gateway server, DNS server, mail server, etc.) for relaying data communication of the management target device, part of such identification information, etc.

The setting functions may include setting functions of any types. For example, the setting functions may at least include a manual setting function capable of setting a communication parameter in response to a user input and an automatic setting function capable of setting a communication parameter independent of operations by the user.

With the above configuration, the communication parameters can be set to the management target device by both the manual setting function and the automatic setting function.

In the parameter presumption step, the functional parameter is presumed based on the setting function associated with (or corresponding to) the communication parameter designated in the change designation step. Therefore, if a parameter inappropriate as a communication parameter is designated in the change designation step, an inappropriate functional parameter can be presumed based on the inappropriate parameter, by which an inappropriate setting might be made to the management target device.

In order to prevent such a problem, the computer program product may be configured as below.

The setting management process may further include a parameter judgment step of judging whether the communication parameter designated in the change designation step is a parameter appropriate as a communication parameter, and the parameter presumption step executes the presumption of the functional parameter only when the communication parameter designated in the change designation step is judged by the parameter judgment step to be appropriate as a communication parameter.

With the above configuration, the presumption of the functional parameter by the parameter presumption step is not executed when the communication parameter designated in the change designation step is inappropriate, by which the inappropriate presumption of the functional parameter and the inappropriate setting to the management target device can be prevented.

In this configuration, the method of judgment employed by the parameter judgment step is not particularly limited as long as the step can judge whether the designated parameter is appropriate as a communication parameter. For example, the parameter judgment step may judge that the designated parameter is appropriate as a communication parameter if the designated parameter satisfies prescribed format and conditions required of a communication parameter (from viewpoints of usable character strings, the number of characters, the makeup of the characters, etc.).

While the user is informed of the existence of the functional parameter (that should be changed together with the communication parameter designated in the change designation step) in the existence information step in the configurations described above, the computer program product may also be configured to let the user actually change the parameters after the existence information step. In this case, in order to reduce the load on the user for the operation, the computer program product may be configured as below.

The setting management process may further include a change selection step of letting the user select whether to change the functional parameter according to the information provided by the existence information step, and a parameter changing step of changing the communication parameter designated in the change designation step together with the functional parameter according to the information provided by the existence information step when the user selects changing the functional parameter in the change selection step, while only changing the communication parameter designated in the change designation step when the user selects not to change functional parameter in the change selection step.

With the above configuration, after the existence information step, the user can change the communication parameter together with the functional parameter according to the information provided by the existence information step only by making a selection to change the functional parameter in the change selection step in response to the provided information.

The change selection step in this configuration is a step for permitting the user to select whether to change the parameters according to the information provided by the existence information step. While the parameter changing step may be configured to change the functional parameter according to the selection by the user, it is also possible to leave out the selection by the user in the change selection step and prevent the changing of the functional parameter by the parameter changing step as needed.

For example, in cases where a single setting function can set multiple communication parameters to the management target device, if another communication parameter has already been set to the management target device by the same setting function (i.e. the setting function of the communication parameter designated in the change designation step), the functional parameter is very likely to have already been set at an appropriate value at the point of the change selection step. In such cases, few problems are expected to occur even if the selection by the user is left out. Therefore, the computer program product may be configured as below.

In cases where the setting functions include a setting function capable of setting communication parameters to the management target device, the change selection step lets the user select whether to change the functional parameter when no other communication parameter has been set to the management target device by the setting function of the communication parameter designated in the change designation step, while leaving out the selection by the user when another communication parameter has already been set to the management target device by the setting function. The parameter changing step only changes the communication parameter designated in the change designation step when the selection by the user is left out in the change selection step.

With the above configuration, when another communication parameter has already been set to the management target device by the same setting function, the selection by the user (on whether to change the functional parameter) is left out in the change selection step and only the communication parameter designated in the change designation step is changed by the parameter changing step without changing the functional parameter.

In order to leave out the selection by the user in the change selection step and prevent the changing of the functional parameter by the parameter changing step as needed, the computer program product may also be configured as below.

The setting management process may further include a first setting permission step of determining whether to permit the setting of communication parameters by each of the setting functions by receiving a user input; and a determination judgment step of judging whether the first setting permission step has determined to permit the setting of communication parameters by the setting function corresponding to the functional parameter. The change selection step lets the user select whether to change the functional parameter when the determination judgment step judges that the first setting permission step has determined to permit the setting of communication parameters by the setting function corresponding to the functional parameter. The parameter changing step only changes the communication parameter designated in the change designation step when the determination judgment step judges that the first setting permission step has determined not to permit the setting of communication parameters by the setting function corresponding to the functional parameter.

With the above configuration, the user can prevent the parameter changing step from changing the functional parameter by determining not to permit the setting of communication parameters by the setting function corresponding to the functional parameter in the first setting permission step.

In this configuration, while information indicating the determination by the first setting permission step (whether to permit the setting of communication parameters by each setting function) may be managed (stored) by the device executing the setting management process, it is also possible to let the management target device manage the information. Therefore, the computer program product may be configured as below.

Information indicating the determination by the first setting permission step may be stored in a storage unit of the management target device as setting permission information. The change selection step lets the user select whether to change the functional parameter when the setting permission information read out from the storage unit of the management target device indicates permission for setting communication parameters by the setting function corresponding to the functional parameter.

With the above configuration, in an environment where there are two or more devices executing the setting management process, once the first setting permission step is executed by a device (executing the setting management process), other devices do not need to execute the first setting permission step any more. Since the setting permission information can be stored in the management target device, the device(s) executing the setting management process is not required to secure a storage area for storing the setting permission information.

The setting management process may further include a stoppage condition judgment step of judging whether a stoppage condition for stopping the data communication by the management target device is satisfied when one of the communication parameters is designated by the user in the change designation step as a communication parameter that should be deleted. The existence information step informs the user that a parameter indicating whether to let the management target device perform data communication should be changed into a parameter indicating stoppage of the data communication when the stoppage condition is judged by the stoppage condition judgment step to be satisfied.

With the above configuration, when the stoppage condition is satisfied when a communication parameter to be deleted is designated by the user in the change designation step, the device can inform the user that the parameter indicating whether to let the management target device perform data communication should be changed into a parameter indicating the stoppage of the data communication.

The "stoppage condition" in this configuration can be, for example, "The communication parameter designated in the change designation step as one that should be deleted is a communication parameter indispensable for letting the management target device execute the data communication". In this case, the computer program product may be configured as below.

The stoppage condition judgment step may judge that the stoppage condition is satisfied when the communication parameter designated in the change designation step as one that should be deleted is one of the communication parameters indispensable for letting the management target device function as a device capable of the data communication.

With the above configuration, the stoppage condition is judged to be satisfied and the aforementioned information is provided to the user by the existence information step when a communication parameter indispensable for letting the management target device function as a device capable of the data communication is designated by the user as one that should be deleted.

As above, in the case where an indispensable communication parameter is designated by the user as one that should be deleted, the user can be presumed to be thinking that there is no problem even if the operation of the management target device for the data communication is stopped. Therefore, by letting the stoppage condition judgment step judge such a state as satisfying the stoppage condition and letting the existence information step provide the information to the user, the existence information step can be carried out in conformity with the intention of the user.

The "stoppage condition" can also be "No communication parameter other than the communication parameter designated in the change designation step has been set to the management target device". In this case, the computer program product may be configured as below.

The stoppage condition judgment step may judge that the stoppage condition is satisfied when no communication parameter other than the communication parameter designated in the change designation step has been set to the management target device.

With the above configuration, the stoppage condition is judged to be satisfied and the aforementioned information is provided to the user by the existence information step when no communication parameter other than the communication parameter designated in the change designation step has been set to the management target device.

As above, in the case where no communication parameter other than the communication parameter designated in the change designation step has been set to the management target device, it is possible to presume that the user desires to stop the operation of the management target device for the data communication. Therefore, by letting the stoppage condition judgment step judge such a state as satisfying the stoppage condition and letting the existence information step provide the information to the user, the existence information step can be carried out in conformity with the intention of the user.

While the stoppage condition judgment step may necessarily judge that the stoppage condition is satisfied in the states explained above, the judgment that the stoppage condition is satisfied may be prohibited as needed, as described below.

The setting management process further may include a second setting permission step of determining whether to permit the changing of the parameter indicating whether to let the management target device perform data communication by receiving a user input. The stoppage condition judgment step judges that the stoppage condition is satisfied on condition that the second setting permission step has determined to permit the changing of the parameter indicating whether to let the management target device perform data communication.

With the above configuration, once the second setting permission step has determined not to permit the changing of the parameter indicating whether to let the management target device perform data communication, the stoppage condition judgment step is prevented from judging that the stoppage condition is satisfied even in states satisfying the stoppage condition.

In this configuration, while information indicating the determination by the second setting permission step (whether to permit the changing of the parameter indicating whether to let the management target device perform data communication) may be managed (stored) by the device executing the setting management process, it is also possible to let the management target device manage the information. Therefore, the computer program product may be configured as below.

Information indicating the determination by the second setting permission step may be stored in a storage unit of the management target device as change permission information. The stoppage condition judgment step judges that the stoppage condition is satisfied when the change permission information read out from the storage unit of the management target device indicates permission for changing the parameter indicating whether to let the management target device perform data communication.

With the above configuration, in an environment where there are two or more management target devices, the settings of all the management target devices can be managed with ease by the device executing the setting management process. Since the change permission information can be stored in each management target device, the device executing the setting management process is not required to secure a storage area for storing the change permission information.

While changing the communication parameter by the parameter changing step may be executed without restriction, the changing may also be restricted arbitrarily. For example, the computer program product may be configured as below.

The setting management process may further include a change restriction step of restricting the changing of the communication parameter designated in the change designation step when a setting for restricting the changing of the communication parameter has been made.

With the above configuration, changing a communication parameter by the parameter changing step can be restricted when the changing of the communication parameter has been restricted by the change restriction step.

Incidentally, the "restricting the changing of the communication parameter" can mean prohibiting the changing itself, permitting changing of part of the communication parameter, etc.

In this configuration, while the communication parameter whose change should be restricted by the change restriction step may be a particular communication parameter that has been determined previously, the communication parameter whose change should be restricted may also be designated arbitrarily by the user. For this purpose, the computer program product may be configured as below.

The setting management process may further include a third setting permission step of determining a communication parameter whose change should be restricted by the change restriction step by receiving a user input. The change restriction step restricts the changing of the communication parameter designated in the change designation step when the communication parameter has been determined by the third setting permission step as the communication parameter whose change should be restricted.

With the above configuration, by previously designating a communication parameter (whose change should be restricted) in the third setting permission step, the changing of the communication parameter can be restricted by the change restriction step.

In this configuration, while information indicating the determination by the third setting permission step (the communication parameter(s) whose change should be restricted by the change restriction step) may be managed (stored) by the device executing the setting management process, it is also possible to let the management target device manage the information. Therefore, the computer program product may be configured as below.

Information indicating the determination by the third setting permission step may be stored in a storage unit of the management target device as change restriction information. The change restriction step restricts the changing of the communication parameter designated in the change designation step when the change restriction information read out from the storage unit of the management target device indicates the restriction of the changing of the communication parameter.

With the above configuration, the device executing the setting management process is not required to secure a storage area for storing the change restriction information since the information can be stored in each management target device.

For the restriction of the changing of the communication parameter in the parameter changing step, the computer program product may also be configured as below.

The setting management process may further include a change restriction step of restricting the changing of the communication parameter designated in the change designation step when the communication parameter has been set by a particular setting function.

With the above configuration, changing a communication parameter (which has been set by the particular setting function) by the parameter changing step can be restricted when the changing has been restricted by the change restriction step.

Incidentally, the "restricting the changing of the communication parameter" can mean prohibiting the changing itself, permitting changing of part of the communication parameter, etc.

In this configuration, while the setting function regarding the restriction by the change restriction step may be a particular setting function that has been determined previously, the setting function regarding the restriction may also be designated arbitrarily by the user. For this purpose, the computer program product may be configured as below.

The setting management process may further include a fourth setting permission step of determining a setting function regarding the restriction by the change restriction step by receiving a user input. The change restriction step restricts the changing of the communication parameter designated in the change designation step when the communication parameter has been set by the setting function determined by the fourth setting permission step.

With the above configuration, by previously designating the setting function regarding the restriction by the change restriction step in the fourth setting permission step, the changing of communication parameters set by the setting function can be restricted by the change restriction step.

In this configuration, while information indicating the determination by the fourth setting permission step (the setting function(s) regarding the restriction by the change restriction step) may be managed (stored) by the device executing the setting management process, it is also possible to let the management target device manage the information. Therefore, the computer program product may be configured as below.

Information indicating the determination by the fourth setting permission step may be stored in a storage unit of the management target device as change restriction information. The change restriction step restricts the changing of the communication parameter designated in the change designation step when the change restriction information read out from the storage unit of the management target device indicates the setting function associated with the communication parameter.

With the above configuration, the device executing the setting management process is not required to secure a storage area for storing the change restriction information since the information can be stored in each management target device.

Each setting management program (computer program product) described above, made of a sequence of instructions (suitable for processing by a computer) arranged in a proper order, can be supplied to a device or a user of the device via a record medium (FD, CD-ROM, memory card, etc.) or a communication line/network (e.g. the Internet). Each setting management program may also be provided to a user by preinstalling the program in a hard disk or memory of a device.

In accordance with another illustrative aspect of the present invention, there is provided a setting management system for managing communication parameters of a management target device in a network to which the communication parameters necessary for functioning as a device capable of data communication via the network according to a prescribed communication protocol can be set by setting functions while registering a setting function used for setting each communication parameter and associating the setting function with the communication parameter. The setting management system includes: a change designation unit which lets a user designate a communication parameter that should be changed out of the communication parameters of the management target device; a parameter presumption unit which presumes a functional parameter regarding a setting function that should be changed together with the communication parameter designated by the user based on the setting function associated with the communication parameter; and an existence information unit which informs the user that there exists a functional parameter that should be changed together with the communication parameter designated by the user when such a functional parameter is presumed by the parameter presumption unit.

With the setting management system configured as above, when a communication parameter that should be changed is designated by the user, a functional parameter that should be changed together with the communication parameter is presumed based on the setting function associated with the communication parameter (i.e. the setting function used for setting the communication parameter) and the user is informed of the existence of such a functional parameter, by which the system can inform the user that the communication parameter designated by the user to be changed and the functional parameter closely related to the communication parameter should be changed in conjunction with each other.

Incidentally, the setting management system may either be composed of one device or multiple devices operating in cooperation with one another.

In accordance with another aspect of the present invention, there is provided a setting management method for managing communication parameters of a management target device in a network to which the communication parameters necessary for functioning as a device capable of data communication via the network according to a prescribed communication protocol can be set by setting functions while registering a setting function used for setting each communication parameter and associating the setting function with the communication parameter. The setting management method includes a change designation step of allowing a user designate a communication parameter of the management target device that should be changed; a parameter presumption step of presuming a functional parameter relating setting function that should be changed together with the designated communication parameter based on the setting function associated with the communication parameter; and an existence information step of informing the user that there exists a functional parameter that should be changed together with the communication parameter designated in the change designation step when such a functional parameter is presumed by the parameter presumption step.

Illustrative Embodiment

Referring now to the drawings, a description will be given in detail of an illustrative embodiments in accordance with the present invention.

FIG. 1 is a block diagram showing a setting management system in accordance with an illustrative embodiment of the present invention. In the setting management system, PCs 10 (Personal Computers 10_1-10_$n$), printers 20 (20_1-20_$m$), a gateway 30, a mail server 40, a primary DNS (Domain Name System) server 50_1, a secondary DNS server 50_2, etc. are connected together by a network to be capable of data communication.

Each PC 10 is a computer system of a well-known type, including a CPU (Central Processing Unit) 11, a ROM (Read Only Memory) 12, a RAM (Random Access Memory) 13, a hard disk 14, a protocol stack 15, a network interface (network I/F) 16, a display unit 17, an input unit 18, etc. which are connected together by a bus 19. Each PC 10 functions as a network device when it is connected to the network via the network I/F 16.

While the protocol stack 15 is shown in FIG. 1 as a component connecting the network I/F 16 to the bus 19, the protocol stack 15 in FIG. 1 is only a symbol conceptualizing a state in which data communication by the network I/F 16 is realized by processes according to the protocol stack 15. Actually, the protocol stack 15 is a program module installed (stored) on the hard disk 14 for implementing data communication according to both IPv4 (Internet Protocol version 4) and IPv6 (Internet Protocol version 6).

The hard disk 14 stores a manager program for issuing instructions according to SNMP (Simple Network Management Protocol) to devices functioning as SNMP agents in order to request each SNMP agent to report or update information stored therein, by which each PC 10 can function as an SNMP manager.

Among the PCs 10, the PC 10_1 is equipped with a setting management program for executing various processes which will be explained later.

Each printer 20 is a network printer of a well-known type, including a CPU 21, a ROM 22, a RAM 23, an NVRAM (Non Volatile RAM) 24, a protocol stack 25, a network interface (network I/F) 26, a user interface (user I/F) 27, a printing unit 28, etc. which are connected by a bus 29. Each printer 20 functions as a network device when it is connected to the network via the network I/F 26.

The NVRAM 24 stores a database (MIB: Management Information Database, in which set values for letting the printer 20 function as a network device are registered) and an agent program for executing the reporting, update, etc. of the information registered in the database according to SNMP in response to an instruction issued by a device functioning as an SNMP manager, by which the printer 20 can function as an SNMP agent. Along with updating the database in response to each instruction from an SNMP manager, the printer 20 also changes its settings corresponding to the contents of the update as will be explained later. The protocol stack 25 is a program module stored in the NVRAM 24, similarly to the protocol stack 15 of each PC 10.

Each printer 20 has a function of sending an error message, etc. to a prescribed destination by e-mail, a function of receiving an e-mail with an attached file containing print data via the network and printing out the print data attached to the e-mail (network print function), etc.

In order to enable each network device (PC 10, printer 20) to execute data communication via the network, an IP address for uniquely identifying the device in the network has to be set (assigned) to the device. Incidentally, while assignment of only one IP address per device is enough in IPv4, each device is generally assigned IP addresses in IPv6.

Irrespective of whether the IP protocol is IPv4 or IPv6, IP addresses can be assigned to devices either by the manual setting function or by the automatic setting function. The manual setting (static setting) is carried out according to the setting management program of the PC 10_1 as will be explained later. Meanwhile, the automatic setting includes two setting functions: "stateful address setting" in which a device obtains an IP address from a DHCP (Dynamic Host Configuration Protocol) server and sets the obtained IP address as its own IP address and "stateless address setting" in which a device generates an IP address (based on a MAC address assigned to its network I/F (16, 26) and information (prefix) which has been preset or which is obtained from a router (not shown), etc. on the network) and sets the generated IP address as its own IP address. While only the stateful address setting can be employed in IPv4, both the stateful address setting and the stateless address setting can be employed in IPv6. When an IP address is set (assigned) to a device as above, the IP address is registered in the database (MIB), associating the IP address with the setting function used for setting the address.

Here, various data (information) registered in the database of each printer 20 will be explained focusing on those necessary for the understanding of the present invention.

(1) IP addresses of the printer 20 itself (each of which is registered as being associated with information indicating a setting function used for setting the IP address)

(2) an IP address of a default router (registered as being associated with information indicating a setting function employed for setting the IP address)

(3) IP addresses of devices (routers) as sources of the prefixes used for generating IP addresses in the stateless address setting (These IP addresses are registered in a list as will be explained later. RAs (Router Advertisements) transmitted from devices other than the routers registered in the list are not received, that is, discarded.)

(4) "automatic setting validity information" indicating whether each of the stateless address setting and the stateful address setting should be enabled or disabled in the printer 20 (Only setting functions specified by the automatic setting validity information to be valid (enabled) are enabled.)

(5) "RA neglect information" indicating whether the printer 20 should neglect RAs (information containing the prefix) sent from routers (The printer 20 receives no prefix from any router while the RA neglect information specifies the neglecting of RAs.)

(6) "IPv6 stoppage information" indicating whether the printer 20 should stop data communication by IPv6 (The printer 20 executes no data communication according to IPv6 while the IPv6 stoppage information specifies the stoppage.)

In the following, several illustrative embodiments in accordance with the present invention, differing in the operation of the PCs 10 or the printers 20 on the network configured as above, will be described in detail.

Illustrative Embodiment 1

(1) Manual Setting Process

First, a manual setting process executed by (the CPU 11 of) the PC 10_1 will be explained in detail referring to a flowchart of FIG. 2. The PC 10_1 executes the manual setting process according to the aforementioned setting management program.

Figure 3:
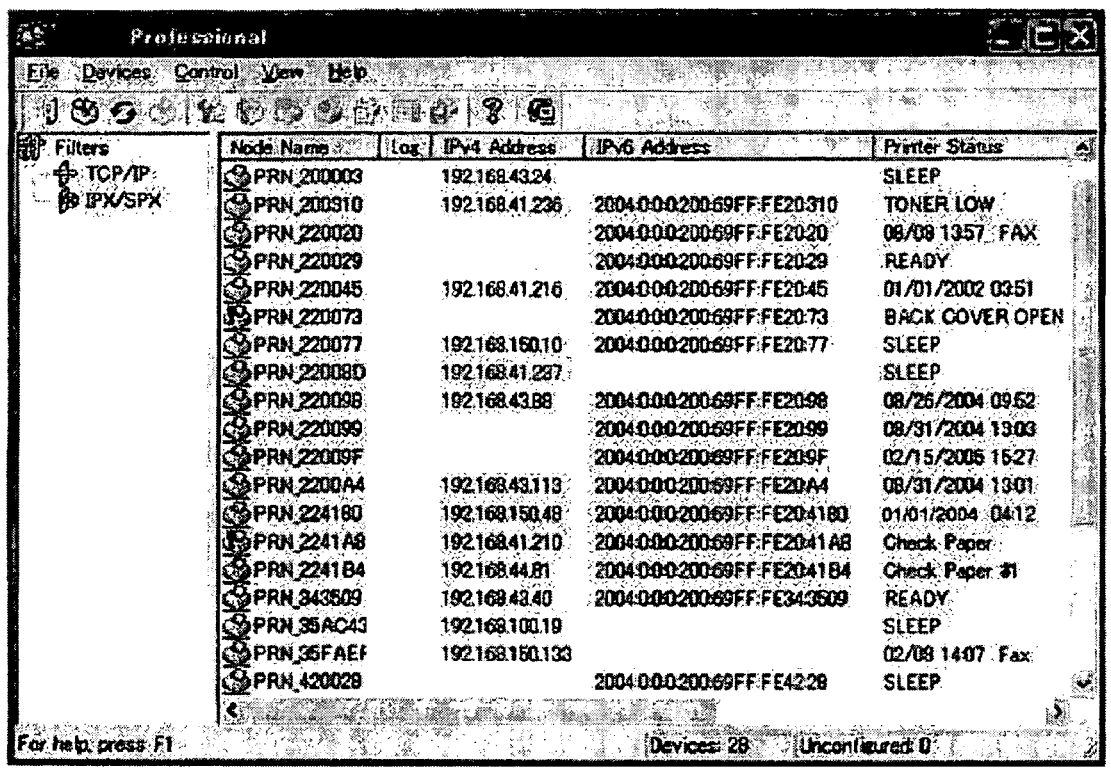
FIG. 3 is a screen image showing a list display screen displayed by the PC according to illustrative aspects of the invention.

When the program is activated by a user of the PC 10_1 by operating the input unit 18, the PC 10_1 searches for devices existing on the network and displays a list of the result of the device search on the display unit 17 (S102). Specifically, the PC 10_1 transmits (broadcast & multicast) request data (for requesting devices on the network to send back general information) according to IPv4 and IPv6. The "general information" means information that has been set to each device, such as the name of the device (Node Name). After collecting information returned from devices receiving the request data for a prescribed time period, the PC 10_1 displays a list display screen (on which pieces of information from the devices are arranged in a list format in regard to each device (Node Name)) on the display unit 17 as shown in FIG. 3. With the list display screen displayed as above, the user can perform various operations (e.g. designating one of the devices in the list) through the input unit 18.

After displaying the list display screen, the PC 10_1 waits for an operation by the user (S104: NO). When an operation is performed by the user (S104: YES), if the operation is the designation of a device (S106: YES), the PC 10_1 inquires of the designated device (hereinafter referred to as a "management target device" (one of the printers 20 in this illustrative embodiment)) about its setting information (S110). In this step, the PC 10_1 transmits inquiry data to the management target device in order to inquire about information corresponding to a subscreen of a setting screen (to be displayed in the following step S112) and database registration information, as the setting information on the management target device. The management target device receiving the inquiry data sends back setting data which indicates the setting information and the registration information. When information inquired by the inquiry data has not been set to the management target device yet, the management target device sends back setting data that can specify that the information has not been set yet (void parameter, etc.). On the other hand, if the operation by the user after the list display screen is displayed is not the designation of a device (S106: NO), the PC 10_1 executes a process corresponding to the operation (other process) (S108) and thereafter returns to S104.

Figure 4A:
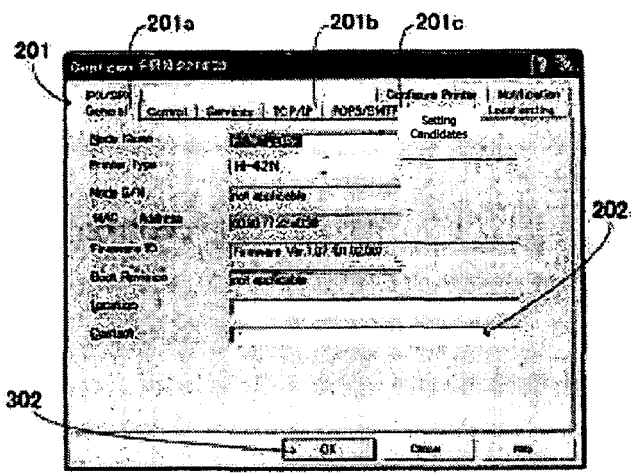
FIG. 4A is a screen image showing a first screen as a subscreen of a setting screen displayed by the PC according to illustrative aspects of the invention.
Figure 4B:
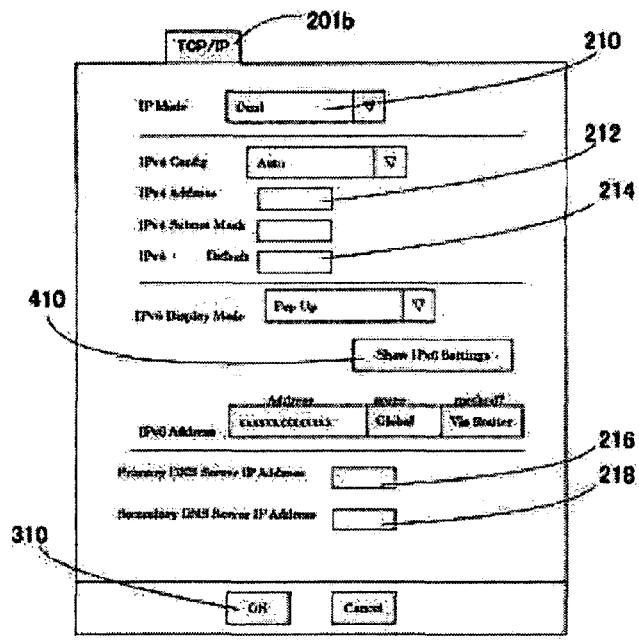
FIG. 4B is a schematic diagram showing a second screen as a subscreen of the setting screen according to illustrative aspects of the invention.

Based on the setting data from the management target device in response to the inquiry of S110, the PC 10_1 displays the setting screen (which is used for setting parameters to the management target device (remote setup)) on the display unit as shown in FIGS. 4A and 4B (S112). The setting screen includes subscreens each of which has a tab 201. By selecting a tab 201, the subscreen being displayed is switched to a subscreen corresponding to the selected tab 201 (having input windows used for entering parameters corresponding to a function specific to the subscreen).

Here, the subscreens of the setting screen will be explained below focusing on those relevant to the present invention. When the step S110 is executed for the first time, a subscreen shown in FIG. 4A is displayed as a first screen for displaying information unique to the management target device. The first screen is also displayed when a "General" tab 201a is selected on any one of other subscreens. The "information unique to the management target device" includes the device name (Node Name) obtained in the aforementioned step S102, the MAC address assigned to the network I/F 26 of the management target device, etc. The first screen has an input window 202 used for inputting a user name of the management target device, an OK button 302, etc. By entering a user name in the input window 202 and performing an operation for selecting the OK button 302 (hereinafter simply described as "pressing" the OK button 302), the user name entered in the input window 202 is set to the management target device as will be explained later. Incidentally, the aforementioned "information" corresponding to the first screen includes the device name (Node Name) of the management target device, etc. The inquiry data transmitted in the step S110 inquires about parameters such as the device name.

When a "TCP/IP" tab 201b is selected on the first screen or any one of other subscreens, a subscreen shown in FIG. 4B is displayed as a second screen (other tabs are omitted in FIG. 4B). On the second screen, various parameters necessary for realizing data communication via the network can be set, such as an IP mode (for configuring the device to be capable of data communication according to IPv4 only, IPv6 only, or both IPv4/IPv6), an IPv4 address assigned to the device, an IP address of the gateway 30 (the so-called "default gateway") and IP addresses of the primary DNS server 50_1 and the secondary DNS server 50_2. The second screen has input windows 210-218 used for entering the above IP addresses, etc. By entering information in the input windows and pressing an OK button 310, the information entered in the input windows is set to the management target device as will be explained later. The second screen is also provided with an IPv6 settings button 410 for letting the PC 10_1 display an "IPv6 settings screen" which is used for making settings of the device regarding IPv6. When the IPv6 settings button 410 is pressed, an "IPv6 setting process" is executed as will be explained later. Incidentally, the aforementioned "information" corresponding to the second screen includes the parameters such as the above IP addresses (including parameters regarding the "IPv6 setting process"). The inquiry data transmitted in the step S110 inquires about these parameters.

Figure 4C:
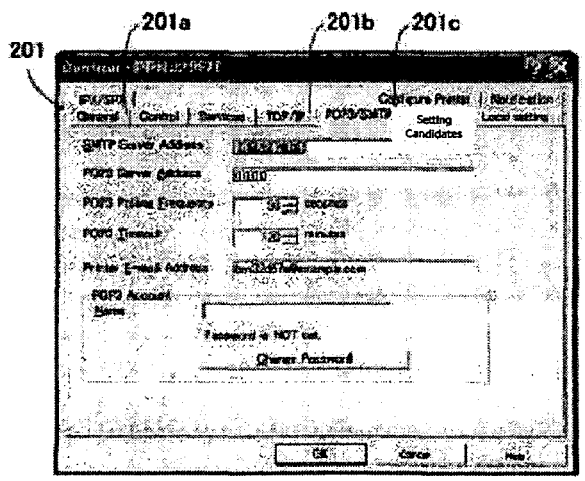
FIG. 4C is a screen image showing another subscreen of the setting screen according to illustrative aspects of the invention.

Other subscreens of the setting screen include a subscreen shown in FIG. 4C (indicating an IP address of the mail server 40, etc. necessary for realizing the aforementioned network print function) which is displayed when a "POP3/SMTP" tab 201c is selected.

After the setting screen has been displayed as above, the user can perform an operation for selecting a tab 201, an operation for inputting a parameter in each input window, an operation for selecting the IPv6 settings button 410, an operation for selecting an OK button, etc. through the input unit 18.

After displaying the setting screen in the step S112, the PC 10_1 waits for an operation by the user (S114: NO). When an operation is performed by the user (S114: YES), whether the operation is an entry in an input window is judged (S116). If the operation is an entry in an input window (S116: YES), the entry (entered parameter) is displayed (incorporated) in the input window (S118) and thereafter the process returns to the step S114.

If the operation by the user is the pressing of the IPv6 settings button 410 on the setting screen (second screen) (S116: NO, S120: YES), the "IPv6 setting process" (explained later) is executed (S122) and thereafter the process returns to the step S114. The IPv6 setting process is a process for letting the user designate parameters regarding IPv6, such as an IPv6 address assigned to the device. The details of the IPv6 setting process will be explained later.

If the operation by the user is a selection of a tab for switching the subscreen of the setting screen (S120: NO, S124: YES), the process returns to the step S110, in which the inquiry data (inquiring about the setting information corresponding to the screen to be displayed in the next step S112 (subscreen corresponding to the selected tab)) is transmitted to the management target device as explained above. Thereafter, the setting screen (subscreen) corresponding to the selected tab is displayed (S112).

After the repetition of the loop of S110-S124, if the operation by the user in the step S114 is the pressing of an OK button on any one of the subscreens of the setting screen (S124: NO, S126: YES), setting instruction data (for instructing the management target device to set the parameters which have been entered in the input windows of all the subscreens of the setting screen, excluding parameters designated in the "IPv6 setting process") is transmitted to the management target device (S128) and thereafter the manual setting process of FIG. 2 is ended. The management target device receiving the setting instruction data sets the parameters to itself or updates parameters already set to itself based on the setting instruction data. Incidentally, while the manual setting process of FIG. 2 is ended after the transmission of the setting instruction data in this illustrative embodiment, it is also possible to configure the manual setting process to return to the step S102 after the transmission of the setting instruction data (S128) in order to repeat the setting instruction for the management target devices.

If the operation by the user in the step S114 is none of the above operations (S124: NO, S126: NO), the PC 10_1 executes a process corresponding to the operation (other process) (S130) and thereafter returns to S114. While the manual setting process explained above is actually configured to erase the setting screen and the list display screen and return to the step S102 when a "Cancel" button on any one of the subscreens of the setting screen is pressed, detailed explanation of the operation (not important for the understanding of the present invention) is omitted here.

(1.2) IPv6 Setting Process

In the following, the details of the IPv6 setting process (S112 of FIG. 2) will be explained referring to flowcharts of FIGS. 5-8B.

Figure 5:
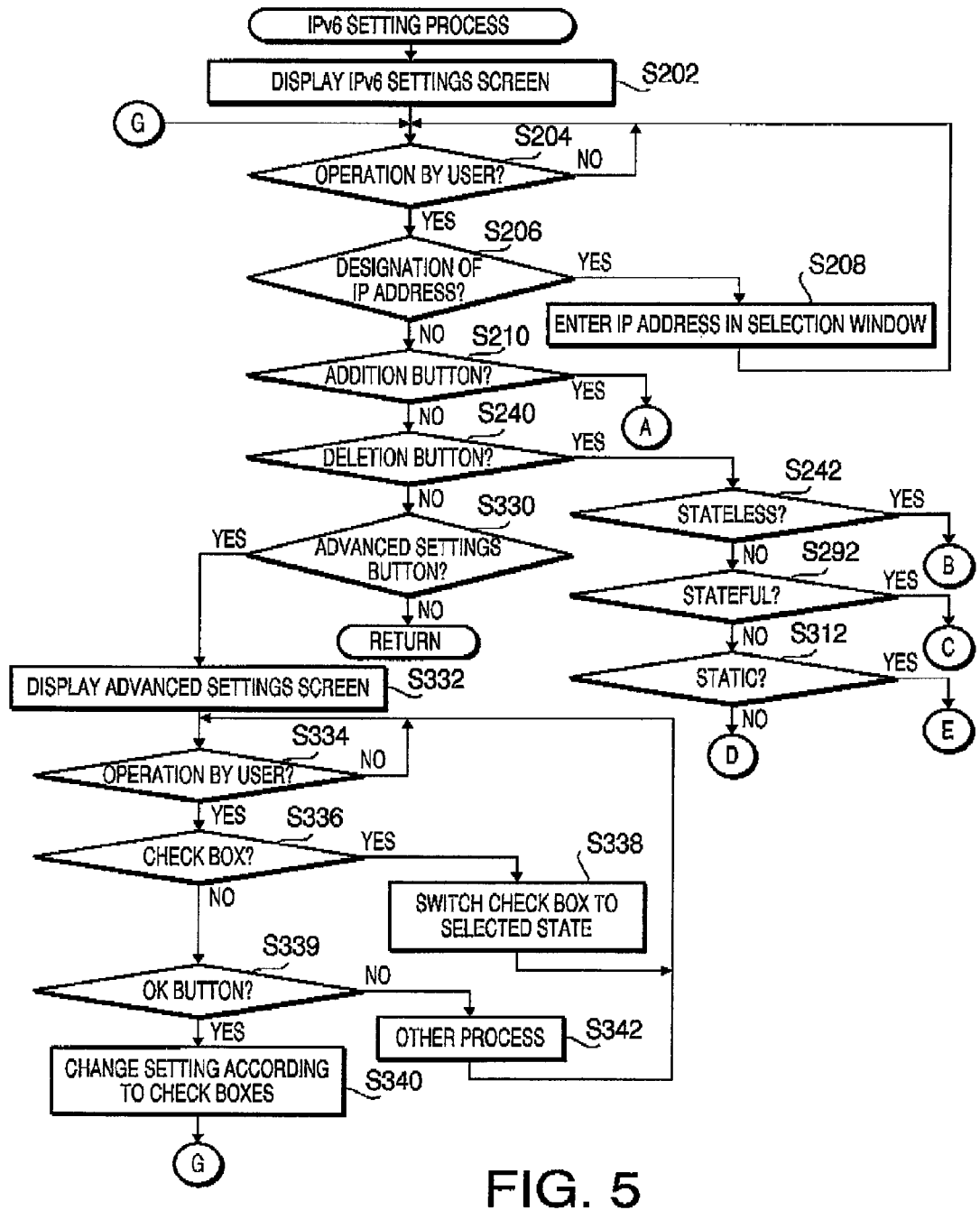
FIGS. 5 through 8B are flowcharts showing an IPv6 setting process executed by the PC according to a first illustrative embodiment of the present invention.
Figure 9A:
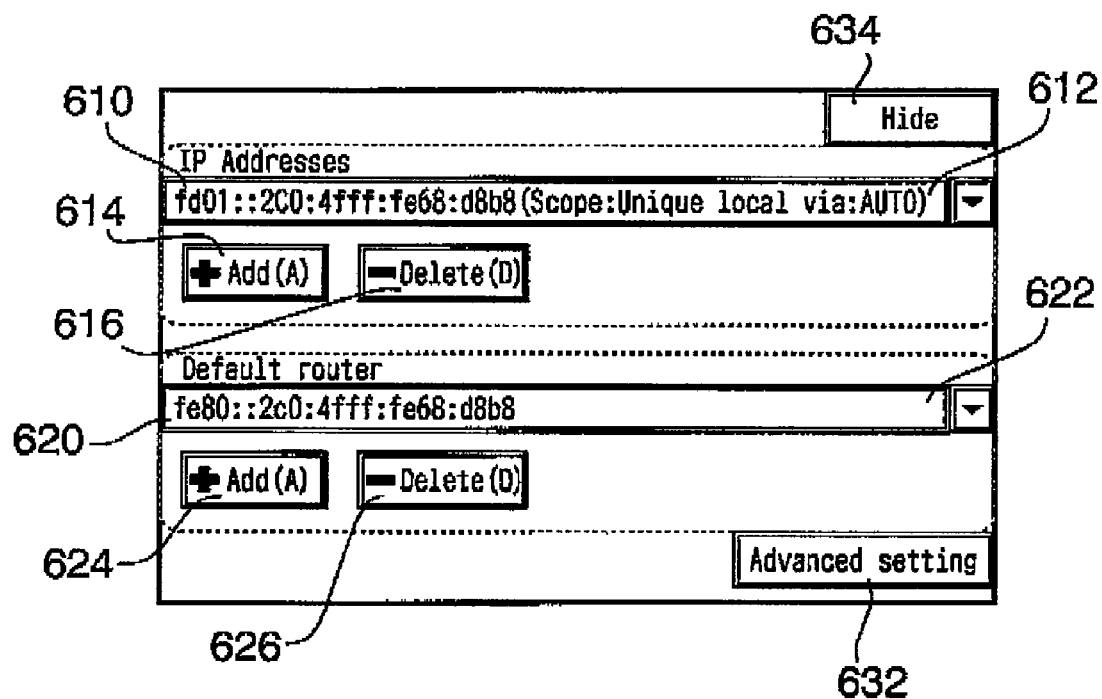
FIG. 9A is a screen image showing art IPv6 settings screen displayed by the PC in accordance with the first illustrative embodiment.

Referring to FIG. 5, at the start of the IPv6 setting process, the PC 10_1 displays an IPv6 settings screen on the display unit 17 (S202). As shown in FIG. 9A, the IPv6 settings screen has a device setting area 610 regarding setting IPv6 addresses assigned to the management target device, a router setting area 620 regarding a default router, an advanced settings button 632 (pressed for calling up an advanced settings screen for making more detailed (advanced) settings), a "Hide" button 634, etc.

The device setting area 610 includes a selection window 612 (for displaying a list of IP addresses set (assigned) to the management target device (IPv6 addresses obtained in S110 of FIG. 2, hereinafter referred to as "device IP addresses") as a pull-down menu so that one of the addresses can be selected from the menu), an addition button 614 (pressed for additionally setting (assigning) a device IP address to the management target device), a deletion button 616 (pressed for deleting a device IP address selected in the selection window 612), etc. In the initial state, the selection window 612 displays one of the device IP addresses set to the management target device for the first time, together with a character string indicating the setting function used for setting the device IP address (the setting function corresponding to the IP address obtained in S110 of FIG. 2).

Similarly, the router setting area 620 includes a selection window 622 (for displaying a list of IP addresses of the default router (IPv6 addresses obtained in S110 of FIG. 2, hereinafter referred to as "router IP addresses") as a pull-down menu so that one of the addresses can be selected from the menu), an addition button 624 (pressed for additionally setting a router IP address to the management target device), a deletion button 626 (pressed for deleting a router IP address selected in the selection window 622), etc. In the initial state, the selection window 622 displays one of the router IP addresses that has been set to the management target device as the actual router IP address, together with a character string indicating the setting function used for setting the router IP address (similarly to the selection window 612 of the device setting area 610).

After the IPv6 settings screen has been displayed on the display unit 17 as above, the user can perform an operation for selecting (designating) an IP address from the selection window 612 or 622, an operation for selecting the addition button 614 or 624, an operation for selecting the deletion button 616 or 626, an operation for selecting the advanced settings button 632, an operation for selecting the "Hide" button 634, etc. through the input unit 18.

After displaying the IPv6 settings screen in the step S202, the PC 10_1 waits for an operation by the user (S204: NO). When an operation is performed by the user (S204: YES), if the operation is the designation of an IP address from the selection window 612 (S206: YES), the designated IP address is entered in the selection window 612 (S208) and thereafter the process returns to the step S204.

In the following, a process executed by the PC 10_1 when the operation by the user in the step S204 is the pressing of the addition button 614 (S206: NO, S210: YES) will be explained referring to FIG. 6.

Figure 6:
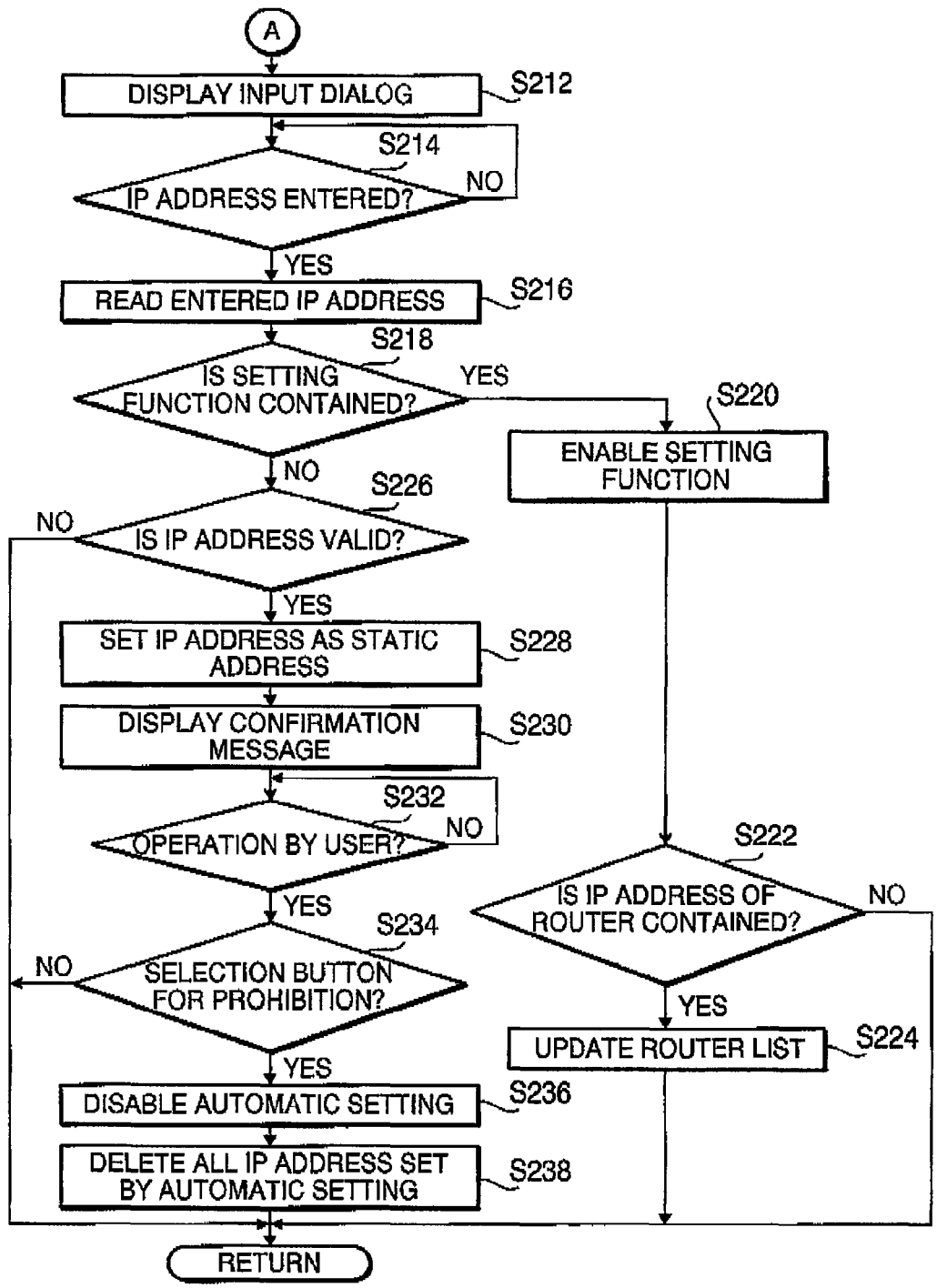
Figure 9B:
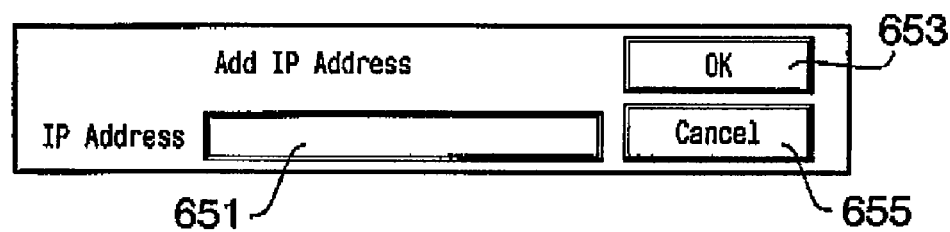
FIG. 9B is a screen image showing an input dialog displayed by the PC in accordance with illustrative aspects of the invention.

At the start of the process of FIG. 6, the PC 10_1 displays an input dialog like the one shown in FIG. 9B in order to prompt the user to enter an IP address to be added (S212) and thereafter waits until an IP address is entered in an input window 651 of the input dialog and an OK button 653 is pressed (S214: NO).

When an IP address (more precisely, a character string indicating an IP address) has been entered in the input window 651 and the OK button 653 has been pressed (S214: YES), the PC 10_1 reads the character string indicating an IP address (S216).

Subsequently, the PC 10_1 checks whether the character string read in S216 contains a character string indicating a setting function (S218). In the input dialog displayed in S212, the user can also enter various character strings regarding the setting function after the character string indicating an IP address, such as a character string indicating whether to allow the setting of subsequent IP addresses by the automatic setting (stateless and/or stateful), a character string indicating an IP address of a router as the source of the prefix in the case of the stateless address setting, etc. In the step S218, the PC 10_1 judges that the character string read in S216 contains a character string indicating a setting function if the character string indicating an IP address is followed by a character string indicating the stateless address setting (e.g. "Stateless") or a character string indicating the stateful address setting ("DHCP", "Stateful", etc.).

If the character string read in S216 is judged to contain a character string indicating a setting function (S218: YES), the PC 10_1 instructs the management target device to enable the setting function indicated by the character string (S220). Since the aforementioned "automatic setting validity information" (indicating whether each of the stateless address setting and the stateful address setting should be enabled or disabled in the management target device) has been registered in the database (MIB) of the management target device, the PC 10_1 in the step S220 transmits a setting request, requesting the enabling of the stateless address setting and/or the stateful address setting in the automatic setting validity information, to the management target device according to SNMP. The management target device receiving the setting request updates information (the automatic setting validity information) according to the setting request and changes its settings accordingly so as to enable the automatic setting function (the stateless address setting and/or the stateful address setting) as will be explained later.

Subsequently, the PC 10_1 checks whether the character string read in S216 contains a character string indicating an IP address of a router (S222). As mentioned above, in the input dialog displayed in S212, the user can also enter a character string indicating an IP address of a router (as the source of the prefix) in the case of the stateless address setting. Therefore, the PC 10_1 in the step S222 judges that the character string read in S216 contains a character string indicating an IP address of a router if the character string indicating the stateless address setting (e.g. "Stateless") is followed by a character string indicating an IP address.

Figure 10:
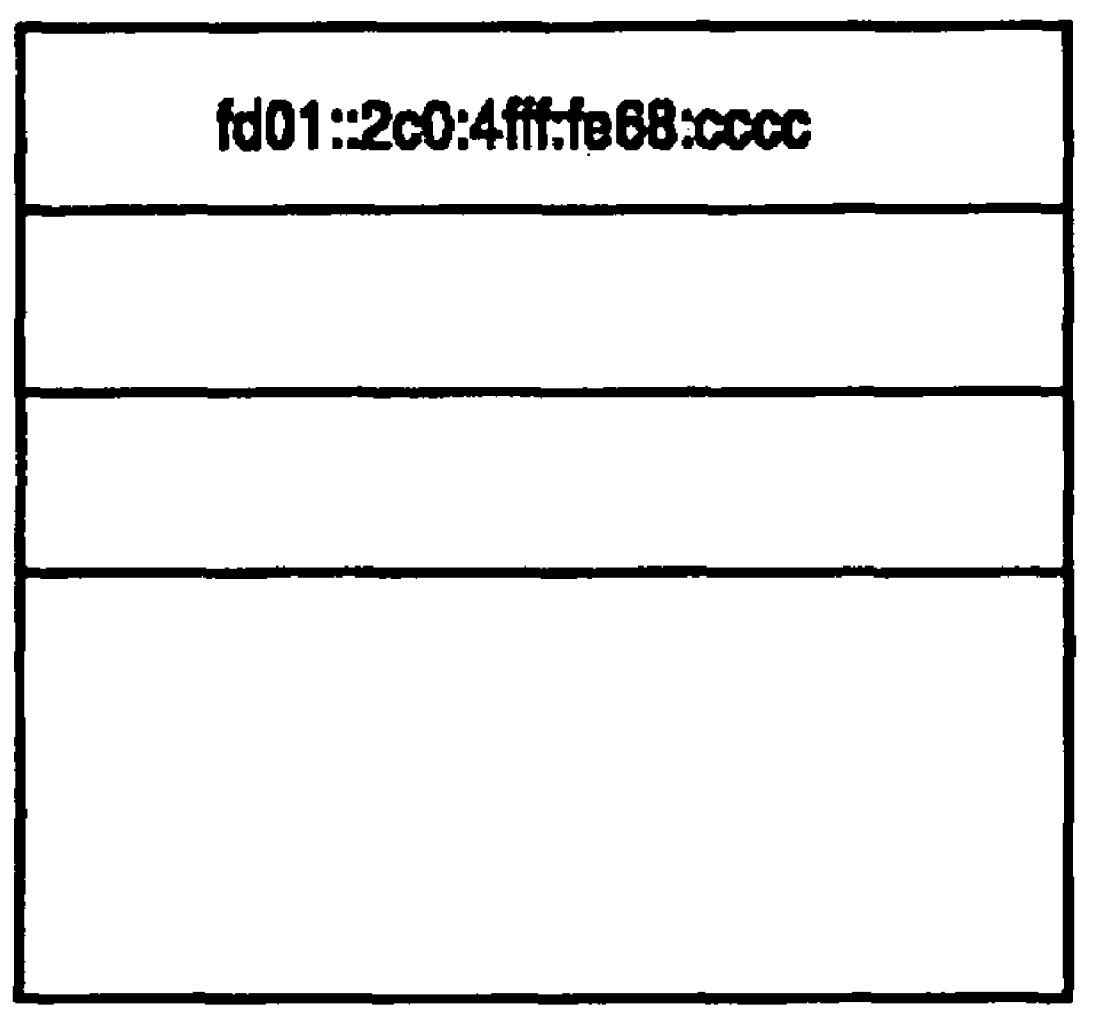

If the character string read in S216 is judged to contain a character string indicating an IP address of a router (S222: YES), the PC 10_1 instructs the management target device to update its router list according to the IP address (S224). In the database of the management target device, a "prohibited router list" like the one shown in FIG. 10 (containing IP addresses of routers that should not be used as the source of the prefix) has been registered. Therefore, the PC 10_1 in the step S224 transmits a setting request, requesting the deletion of the IP address contained in the character string read in S216 from the prohibited router list, to the management target device according to SNMP. The management target device receiving the setting request updates information (the prohibited router list) according to the setting request as will be explained later, by which the management target device starts obtaining the prefix from the router deleted from the prohibited router list.

After finishing the step S224, or if the character string read in S216 is judged to contain no character string indicating an IP address of a router in S222 (S222: NO), the PC 10_1 ends the IPv6 setting process and returns to the step S114 of FIG. 2.

In the aforementioned step S218, if the character string read in S216 is judged to contain no character string indicating a setting function (S218: NO), the PC 10_1 checks whether the IP address read in S216 is valid (S226). In this step, whether the character string read in S216 is appropriate as an IPv6 address is judged by checking whether the character string includes an improper character, whether the character string is made up of a proper number of characters, etc.

If the IP address read in S216 is judged to be invalid (S226: NO), the PC 10_1 ends the IPv6 setting process and returns to the step S114 of FIG. 2.

On the other hand, if the IP address read in S216 is judged to be valid (S226: YES), the PC 10_1 instructs the management target device to set the IP address as a manually set address (static address) (S228). Since each IP address is registered in the database of the management target device while being associated with a setting function, the PC 10_1 in the step S228 transmits a setting request, requesting the registration of the IP address read in S216 associating it with the manual setting function (information indicating that the IP address has been set by the manual setting), to the management target device according to SNMP. The management target device receiving the setting request updates information (the database) according to the setting request, by which the IP address as a manually set address (static address) is set (assigned) to the management target device.

Figure 11A:
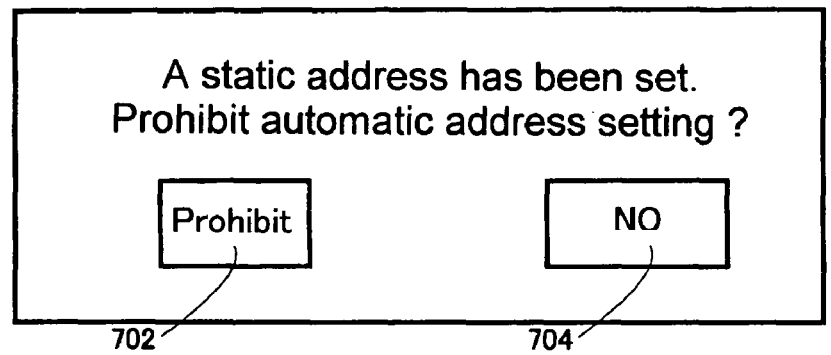
FIG. 11A is a schematic diagram showing an automatic setting prohibition confirmation screen displayed by the PC according to illustrative aspects of the invention.

Subsequently, the PC 10_1 displays a confirmation message (asking the user whether the automatic setting should be prohibited) on the display unit 17 (S230). In this step, the PC 10_1, presuming that the user believes that the automatic setting function is unnecessary (or there is no problem even if the automatic setting function is disabled) based on the fact that an IP address has just been set by the manual setting function in S228, displays an automatic setting prohibition confirmation screen (with the confirmation message asking whether to prohibit the automatic setting) on the display unit 17 as shown in FIG. 11A. In addition to the confirmation message, the automatic setting prohibition confirmation screen includes selection buttons 702 and 704 for letting the user select whether to prohibit the automatic setting. After the automatic setting prohibition confirmation screen has been displayed as above, the user can perform an operation for selecting the selection button 702 or 704 through the input unit 18.

After displaying the confirmation message as above, the PC 10_1 waits for an operation by the user (S232: NO). When an operation is performed by the user (S232: YES), if the operation is the pressing of the selection button 704 designating no prohibition of the automatic setting (S234: NO), the PC 10_1 ends the IPv6 setting process and returns to the step S114 of FIG. 2.

On the other hand, if the operation by the user is the pressing of the selection button 702 designating the prohibition of the automatic setting (S234: YES), the PC 10_1 instructs the management target device to disable the whole automatic setting function (both the stateless address setting and the stateful address setting) (S236). Since the automatic setting validity information has been registered in the database of the management target device as mentioned above, the PC 10_1 in the step S236 transmits a setting request, requesting the disabling of both the stateless address setting and the stateful address setting in the automatic setting validity information, to the management target device according to SNMP. The management target device receiving the setting request updates information (the automatic setting validity information) according to the setting request and changes its settings accordingly so as to disable the automatic setting function.

Subsequently, the PC 10_1, presuming that IP addresses that have been set to the management target device by the automatic setting will be unnecessary based on the fact that the prohibition of the automatic setting has just been selected in S234, instructs the management target device to delete all the IP addresses set by the automatic setting (S238), ends the IPv6 setting process, and returns to the step S114 of FIG. 2. Since each IP address is registered in the database of the management target device while being associated with information indicating a setting function as mentioned above, the PC 10_1 in the step S238 transmits a setting request, requesting the deletion of all the IP addresses associated with information indicating either the stateless address setting or the stateful address setting from the database, to the management target device according to SNMP. The management target device receiving the setting request updates information (the database) according to the setting request, by which the setting (assignment) of such IP addresses to the management target device is invalid (such IP addresses already set are deleted).

In the following, a process executed by the PC 10_1 when the operation by the user in the step S204 of FIG. 5 is the pressing of the deletion button 616 (S210: NO, S240: YES) will be explained referring to FIGS. 5, 7 and 8.

Figure 2:
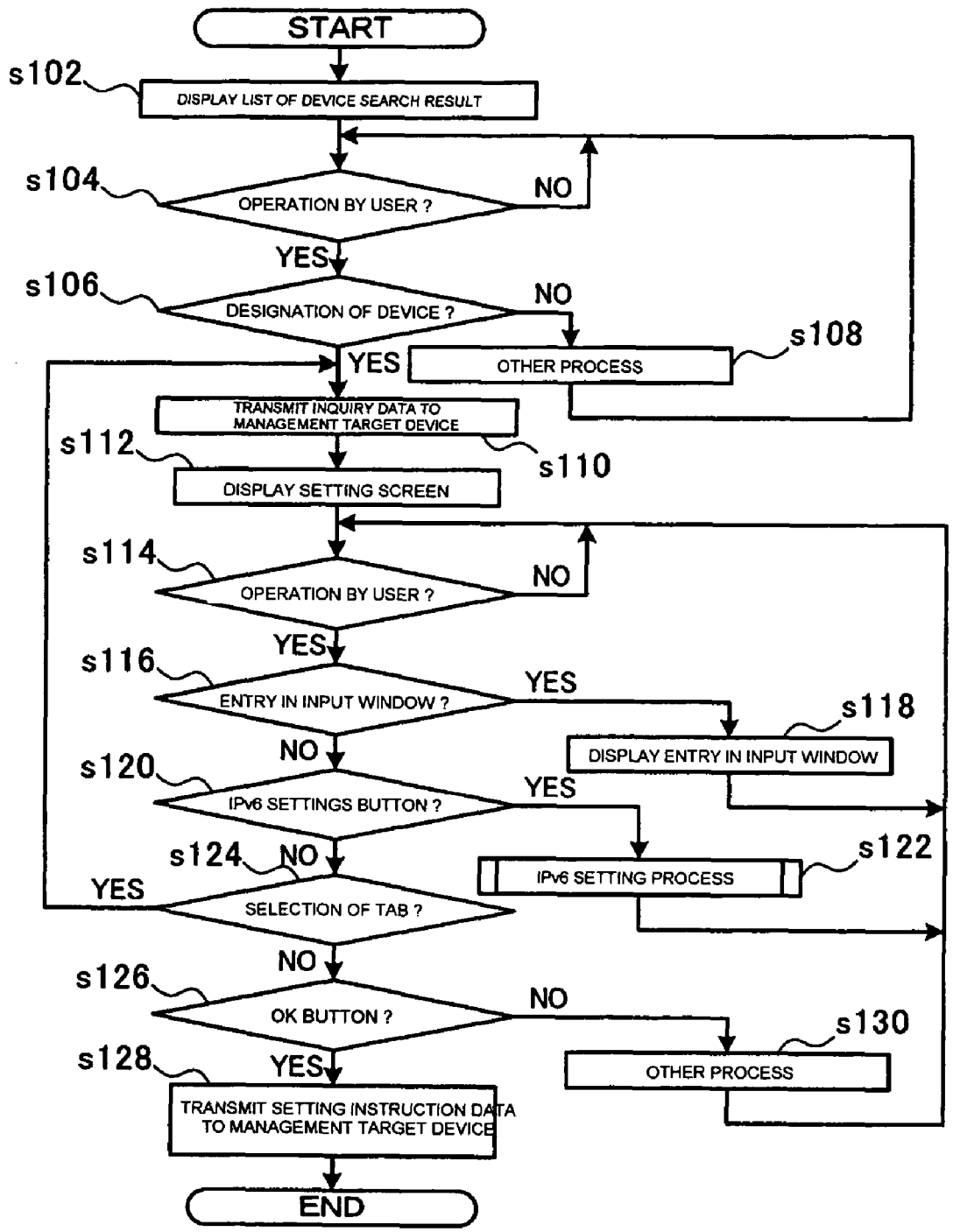
FIG. 2 is a flowchart showing a manual setting process executed by a PC in the setting management system in accordance with illustrative aspects of the invention.

First, the PC 10_1 checks whether the setting function corresponding to the IP address that had been entered in the selection window 612 at the point when the deletion button 616 was pressed (the setting function corresponding to the IP address obtained in the step S110 of FIG. 2) is the stateless address setting (S242). In this step, the PC 10_1 judges that the IP address entered in the selection window 612 (at the point when the deletion button 616 was pressed in the step S204) was set by the stateless address setting if the IP address in the selection window 612 has been associated with information such as "Stateless" and an IP address of a router (from which the prefix was obtained for the generation of the IP address in the selection window 612).

Figure 11B:
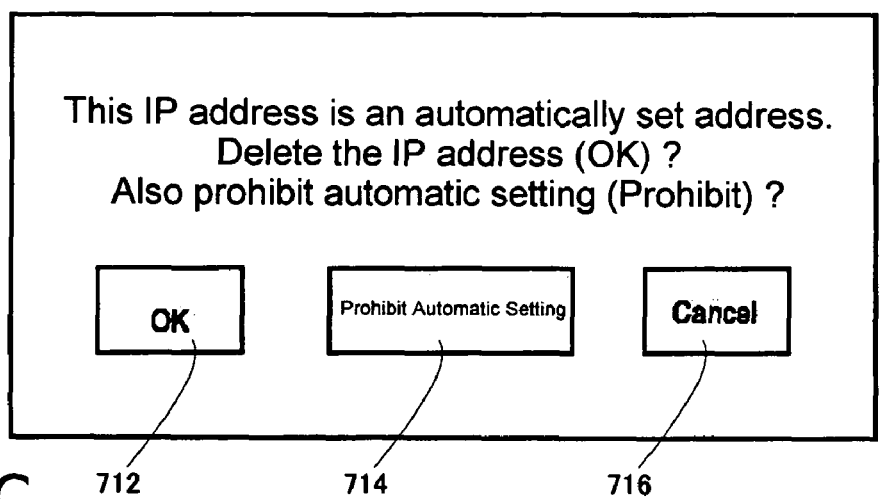
FIG. 11B is a schematic diagram showing another automatic setting prohibition confirmation screen displayed by the PC according to illustrative aspects of the invention.

If the setting function corresponding to the IP address in the selection window 612 is judged to be the stateless address setting (S242: YES), the PC 10_1 displays a confirmation message (for letting the user recognize that the IP address has been set automatically and asking the user whether the automatic setting should be prohibited) on the display unit 17 (S244 in FIG. 7). In this step, the PC 10_1 presuming that the user believes that the automatic setting function may be disabled based on the fact that the IP address that the user desires to delete is an automatically set address, displays an automatic setting prohibition confirmation screen (with the confirmation message for informing the user that the IP address is an automatically set address and asking whether to prohibit the automatic setting) on the display unit 17 as shown in FIG. 11B. In addition to the confirmation message, the automatic setting prohibition confirmation screen includes a selection button 714 (pressed for requesting the prohibition of the automatic setting), an OK button 712 (pressed for requesting the deletion of the IP address only) and a "Cancel" button 716. After the automatic setting prohibition confirmation screen has been displayed as above, the user can perform an operation for selecting the button 712, 714 or 716 through the input unit 18.

After displaying the confirmation message as above, the PC 10_1 waits for an operation by the user (S246: NO). When an operation is performed by the user (S246: YES), if the operation is pressing the "Cancel" button 716 (S248: NO, S250: NO), the PC 10_1 ends the IPv6 setting process and returns to the step S114 of FIG. 2.

If the operation by the user is pressing the OK button 712 (S248: NO, S250: YES), the PC 10_1 checks whether the automatic setting has been enabled in the management target device (S252). In this step, the check is carried out based on automatic setting validity information (indicating whether the automatic setting has been enabled or disabled) contained in the setting information obtained in the step S110 of FIG. 2.

If the automatic setting has not been enabled in the management target device (S252: NO), only when the IP address entered in the selection window 612 is an address other than a link-local address (S254: YES) and an IP address other than the one entered in the selection window 612 (i.e. an IP address other than the one that is going to be deleted) has already been set to the management target device (S256: YES), the PC 10_1 instructs the management target device to delete the IP address that had been entered in the selection window 612 at the point when the deletion button 616 was pressed (S258), ends the IPv6 setting process, and returns to the step S114 of FIG. 2. In the step S254, the PC 10_1 checks whether the IP address entered in the selection window 612 is a link-local address, since the link-local address is indispensable for realizing data communication according to IPv6 and deleting an link-local address might negatively impact normal data communication according to IPv6. In the step S256, the PC 10_1 judges that an IP address other than the one that is going to be deleted has already been set to the management target device if the information obtained in the step S110 indicates that there exists another IP address (other than the one that is going to be deleted) that has been set to the management target device. The check of S256 is conducted for the same purpose as the check of S254 regarding the link-local address. Therefore, the IP address entered in the selection window 612 is deleted in the step S258 only when the IP address entered in the selection window 612 is not a link-local address (S254: YES) and there exists another IP address that has already been set to the management target device (S256: YES).

In the step S258, the PC 10_1 transmits a setting request, requesting the deletion of the IP address entered in the selection window 612 at the point when the deletion button 616 was pressed (out of the IP addresses obtained in the step S110), to the management target device according to SNMP. The management target device receiving the setting request updates information (the database) according to the setting request, by which the setting (assignment) of the IP address to the management target device is invalid (the IP address already set is deleted).

Figure 11C:
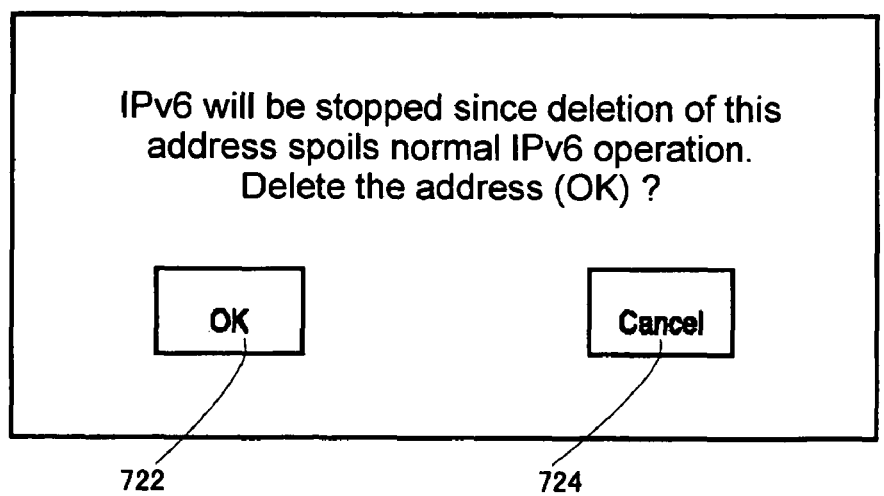
FIG. 11C is a schematic diagram showing an interruption confirmation screen displayed by the PC according to illustrative aspects of the invention.

Meanwhile, when the IP address entered in the selection window 612 is a link-local address (S254: NO) or no IP address other than the one entered in the selection window 612 has been set to the management target device (i.e. only the IP address that is going to be deleted has been set to the management target device) (S256: NO), the PC 10_1 displays a confirmation message (for informing the user that the deletion of the IP address can negatively impact normal data communication) on the display unit 17 (S260). In this step, the PC 10_1 displays an interruption confirmation screen (with the confirmation message indicating that the deletion of the IP address can negatively impact normal data communication) on the display unit 17 as shown in FIG. 11C. In addition to the confirmation message, the interruption confirmation screen includes an OK button 722 (pressed for forcibly deleting the IP address) and a "Cancel" button 724. After the interruption confirmation screen has been displayed as above, the user can perform an operation for selecting the button 722 or 724 through the input unit 18.

After displaying the confirmation message as above, the PC 10_1 waits for an operation by the user (S262: NO). When an operation is performed by the user (S262: YES), if the operation is the pressing of the OK button 722 (S264: YES), the PC 10_1 instructs the management target device to stop (disable) data communication according to IPv6 (S266) and thereafter advances to the step S258. Since IPv6 function validity information (indicating whether to enable or disable data communication according to IPv6) has been registered in the database of the management target device, the PC 10_1 in the step S266 transmits a setting request, requesting the updating of the IPv6 function validity information to information indicating the disabling of the data communication according to IPv6, to the management target device according to SNMP. The management target device receiving the setting request updates information (the IPv6 function validity information) according to the setting request, by which data communication by IPv6 is stopped (interrupted).

If the operation by the user is the pressing of the "Cancel" button 724 (S264: NO), the PC 10_1 ends the IPv6 setting process without executing the steps S266 and S258, and returns to the step S114 of FIG. 2.

In the aforementioned step S252, if the automatic setting has been enabled in the management target device (S252: YES), the PC 10_1 directly advances to the step S258 (skipping the steps S254 and S256) and instructs the management target device to delete the IP address.

Figure 12A:
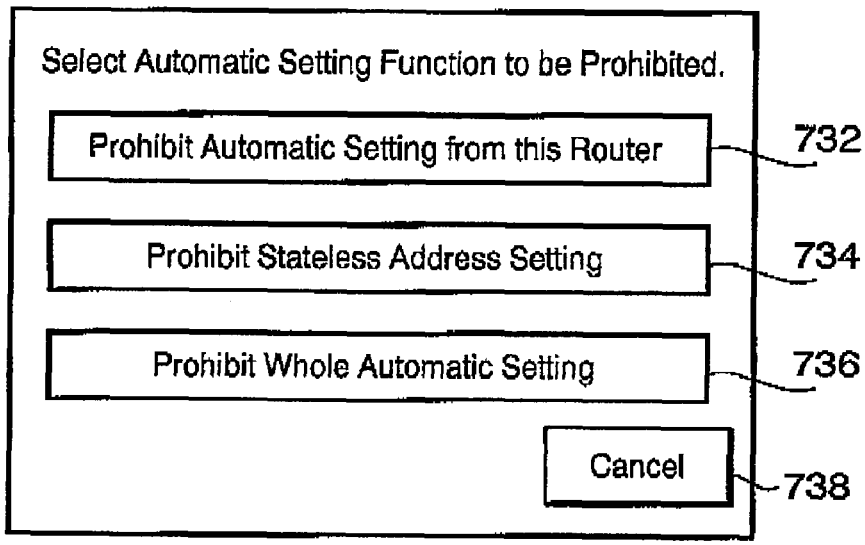
FIG. 12A is a schematic diagram showing a prohibition selection screen displayed by the PC according to illustrative aspects of the invention.

If the operation by the user in S246 is the pressing of the automatic setting prohibition button 714 (S248: YES), the PC 10_1 inquires of the user which automatic setting function (stateless and/or stateful) should be prohibited (S270). In this step, the PC 10_1 displays a prohibition selection screen (for letting the user select which automatic setting function should be prohibited) on the display unit 17 as shown in FIG. 12A. The prohibition selection screen has a first prohibition button 732 (pressed for prohibiting automatic setting using a prefix that has been used for generating the IP address to be deleted (i.e. automatic setting using the router as the source of the prefix)), a second prohibition button 734 (pressed for prohibiting the stateless address setting), a third prohibition button 736 (pressed for prohibiting not only the stateless address setting but also the stateful address setting (i.e. the whole automatic setting function)), a "Cancel" button 738, etc. After the prohibition selection screen has been displayed as above, the user can perform an operation for selecting the button 734, 736 or 738 through the input unit 18.

After displaying the prohibition selection screen as above, the PC 10_1 waits for an operation by the user (S272: NO). When an operation is performed by the user (S272: YES), if the operation is the pressing of the third prohibition button 736 (S274: YES), the PC 10_1 first instructs the management target device to disable the stateful address setting (S276). Since the automatic setting validity information (indicating whether each of the stateless address setting and the stateful address setting should be enabled or disabled) has been registered in the database of the management target device, the PC 10_1 in the step S276 transmits a setting request, requesting the disabling of the stateful address setting (DHCP setting) in the automatic setting validity information, to the management target device according to SNMP. The management target device receiving the setting request updates information (the automatic setting validity information) according to the setting request and changes its settings accordingly so as to disable the stateful address setting.

Subsequently, the PC 10_1 instructs the management target device to delete all the IP addresses that have been set by the stateful address setting (S278). Since each IP address is registered in (a list of) the database of the management target device while being associated with information indicating a setting function as mentioned above, the PC 10_1 in the step S278 transmits a setting request, requesting the deletion of all the IP addresses associated with the stateful address setting from the database, to the management target device according to SNMP. The management target device receiving the setting request updates information (the database) according to the setting request, by which setting such IP addresses to the management target device is invalid (such IP addresses already set are deleted).

Subsequently, the PC 10_1 instructs the management target device to disable the stateless address setting (S280). In this step, the PC 10_1 transmits a setting request, requesting the disabling of the stateless address setting in the automatic setting validity information, to the management target device according to SNMP.

Thereafter, the PC 10_1 instructs the management target device to delete all the IP addresses that have been set by the stateless address setting (S282), ends the IPv6 setting process, and returns to the step S114 of FIG. 2. In the step S282, the PC 10_1 transmits a setting request, requesting the deletion of all the IP addresses associated with the stateless address setting from the database, to the management target device according to SNMP.

If the operation by the user in the step S272 is pressing the second prohibition button 734 (S274: NO, S284: YES), the PC 10_1 advances to the aforementioned step S280. In this case, the PC 10_1 disables the stateless address setting (S280) and deletes the IP addresses set by the stateless address setting (S282), ends the IPv6 setting process, and returns to the step S114 of FIG. 2.

If the operation by the user in the step S272 is pressing the first prohibition button 732 (S284: NO, S286: YES), the PC 10_1 instructs the management target device to update the router list based on the IP address of the router as the source of the prefix used for the generation of the IP address entered in the selection window 612 at the point when the deletion button 616 was pressed (S288). Since the "prohibited router list" like the one shown in FIG. 10 (containing IP addresses of routers that should not be used as the source of the prefix) has been registered in the database of the management target device, the PC 10_1 in the step S288 transmits a setting request to the management target device according to SNMP requesting the registration of the IP address of the router in the prohibited router list. The management target device receiving the setting request updates information (the prohibited router list) according to the setting request, by which the management target device will not obtain the prefix from the routers registered in the updated prohibited router list.

After finishing the step S288, the PC 10_1 advances to the aforementioned step S252. After the process of S252-S258 is finished, the PC 10_1 ends the IPv6 setting process and returns to the step S114 of FIG. 2.

If the operation by the user in the step S272 is pressing the "Cancel" button 738 (S286: NO), the PC 10_1 ends the IPv6 setting process and returns to the step S114 of FIG. 2.

Returning to FIG. 5, if the setting function corresponding to the IP address in the selection window 612 is judged not to be the stateless address setting (S242: NO), the PC 10_1 checks whether the setting function is the stateful address setting (S292). In this step, the PC 10_1 judges that the IP address entered in the selection window 612 (at the point when the deletion button 616 was pressed in the step S204) was set by the stateful address setting if the IP address in the selection window 612 has been associated with information indicating the stateful address setting ("DHCP", "Stateful", etc.).

Figure 12B:
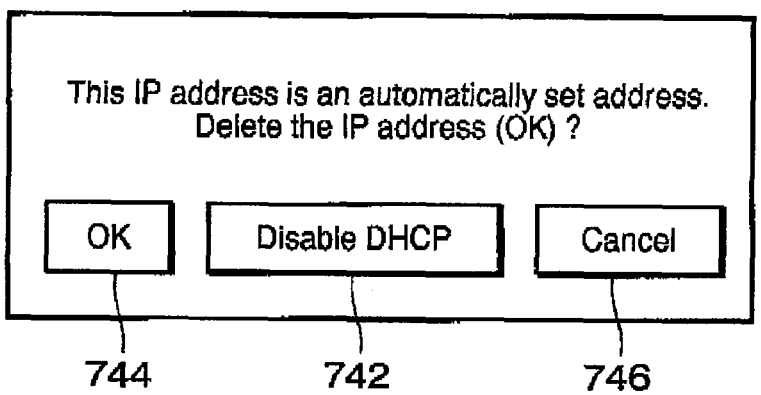
FIG. 12B is a schematic diagram showing another automatic setting prohibition confirmation screen displayed by the PC according to illustrative aspects of the invention.

If the setting function corresponding to the IP address in the selection window 612 is judged to be the stateful address setting (S292: YES), the PC 10_1 displays a confirmation message (allowing the user to recognize that the IP address has been set automatically and asking the user whether the automatic setting should be prohibited) on the display unit 17 (S294 in FIG. 8A). In this step, the PC 10_1, presuming that the user believes that the automatic setting function may be disabled based on the fact that the IP address that the user desires to delete is an automatically set address, displays an automatic setting prohibition confirmation screen (with the confirmation message informing the user that the IP address is an automatically set address and asking whether the stateful address setting (DHCP setting) should be prohibited) on the display unit 17 as shown in FIG. 12B. In addition to the confirmation message, the automatic setting prohibition confirmation screen includes a prohibition button ("Disable DHCP") 742 (pressed for requesting the prohibition of the stateful address setting), an OK button 744 (pressed for requesting the deletion of the IP address only) and a "Cancel" button 746. After the automatic setting prohibition confirmation screen has been displayed as above, the user can perform an operation for selecting the button 742, 744 or 746 through the input unit 18.

After displaying the confirmation message as above, the PC 10_1 waits for an operation by the user (S296: NO). When an operation is performed by the user (S296: YES), if the operation is pressing the prohibition button 742 (S298: YES), the PC 10_1 instructs the management target device to disable the stateful address setting and delete all the IP addresses that have been set by the stateful address setting (S300, S302) similarly to the steps S276 and S278 of FIG. 7, ends the IPv6 setting process, and returns to the step S114 of FIG. 2.

If the operation by the user in the step S296 is pressing the OK button 744 (S298: NO, S304: YES), similarly to the aforementioned step S258 of FIG. 7, the PC 10_1 instructs the management target device to delete the IP address entered in the selection window 612 at the point when the deletion button 616 was pressed (S306), ends the IPv6 setting process, and returns to the step S114 of FIG. 2.

If the operation by the user in the step S296 is pressing the "Cancel" button 746 (S304: NO), the PC 10_1 ends the IPv6 setting process (without executing S306) and returns to the step S114 of FIG. 2.

Returning to FIG. 5, if the setting function corresponding to the IP address in the selection window 612 is judged not to be the stateful address setting in the step S292 (S292: NO), the PC 10_1 checks whether the setting function is the manual setting (static setting) (S312). In this step, the PC 10_1 judges that the IP address entered in the selection window 612 was set by the manual setting if the IP address entered in the selection window 612 at the point when the deletion button 616 was pressed is followed by no character string (or followed by a character string not that does not indicate whether the address setting is stateless or stateful).

If the setting function is judged not to be the manual setting in S312, that is, when the IP address is a link-local address for example (S312: NO), the PC 10_1 advances to the step S252 of FIG. 7. The process from the step S252 has already been explained above, and thus repeated explanation thereof is omitted here.

Figure 12C:
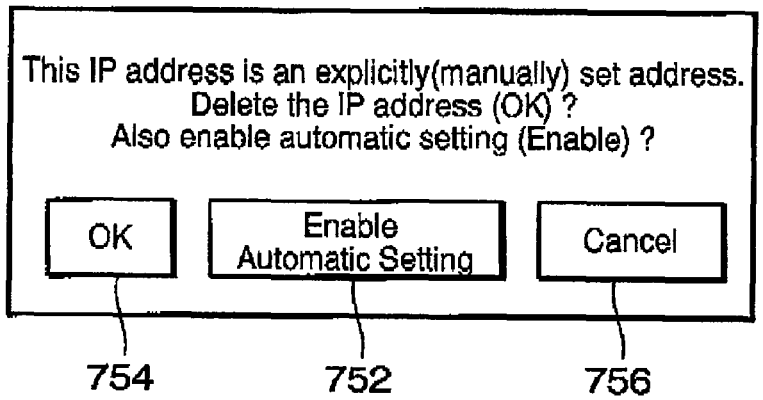
FIG. 12C is a schematic diagram showing an automatic setting enabling confirmation screen displayed by the PC according to illustrative aspects of the invention.

If the setting function is judged to be the manual setting (S312: YES), the PC 10_1 displays a confirmation message (allowing the user to recognize that the IP address has been set manually and asking the user whether the automatic setting should be enabled) on the display unit 17 (S314). In this step, the PC 10_1, presuming that the user believes that the automatic setting function may be enabled based on the fact that the IP address that the user desires to delete is a manually set address (static address), displays an automatic setting enabling confirmation screen (with the confirmation message for informing the user that the IP address is a manually set address and asking whether the automatic setting should be enabled) on the display unit 17 as shown in FIG. 12C. In addition to the confirmation message, the automatic setting enabling confirmation screen includes an "Enable" button 752 (pressed for requesting the enablement of the automatic setting), an OK button 754 (pressed for requesting deletion the IP address only) and a "Cancel" button 756. After the automatic setting enabling confirmation screen has been displayed as above, the user can perform an operation for selecting the button 752, 754 or 756 through the input unit 18.

After displaying the confirmation message as above, the PC 10_1 waits for an operation by the user (S316: NO). When an operation is performed by the user (S316: YES), if the operation is pressing the "Enable" button 752 (S318: YES), the PC 10_1 instructs the management target device to enable the stateful address setting and the stateless address setting (S320, S322). Since the automatic setting validity information (indicating whether each of the stateless address setting and the stateful address setting should be enabled or disabled) has been registered in the database of the management target device as mentioned above, the PC 10_1 in the steps S320 and S322 transmits setting requests, requesting the enablement of the stateful address setting (DHCP setting) and the stateless address setting in the automatic setting validity information, to the management target device according to SNMP. The management target device receiving the setting requests updates information (the automatic setting validity information) according to the setting request and changes its settings accordingly so as to enable the automatic setting (stateful & stateless).

Subsequently, similarly to the step S258 of FIG. 7, the PC 10_1 instructs the management target device to delete the IP address that had been entered in the selection window 612 at the point when the deletion button 616 was pressed (S324), ends the IPv6 setting process, and returns to the step S114 of FIG. 2.

If the operation by the user in the step S316 is pressing the OK button 754 (S318: NO, S326: YES), the PC 10_1 instructs the management target device to delete the IP address (S324), ends the IPv6 setting process, and returns to the step S114 of FIG. 2.

If the operation by the user in the step S316 is pressing the "Cancel" button 756 (S326: NO), the PC 10_1 ends the IPv6 setting process (without executing S324) and returns to the step S114 of FIG. 2.

In the following, a process executed by the PC 10_1 when the operation by the user in the step S204 of FIG. 5 is pressing the advanced settings button 632 shown in FIG. 9A (S240: NO, S330: YES) will be explained referring again to FIG. 5.

Figure 13:
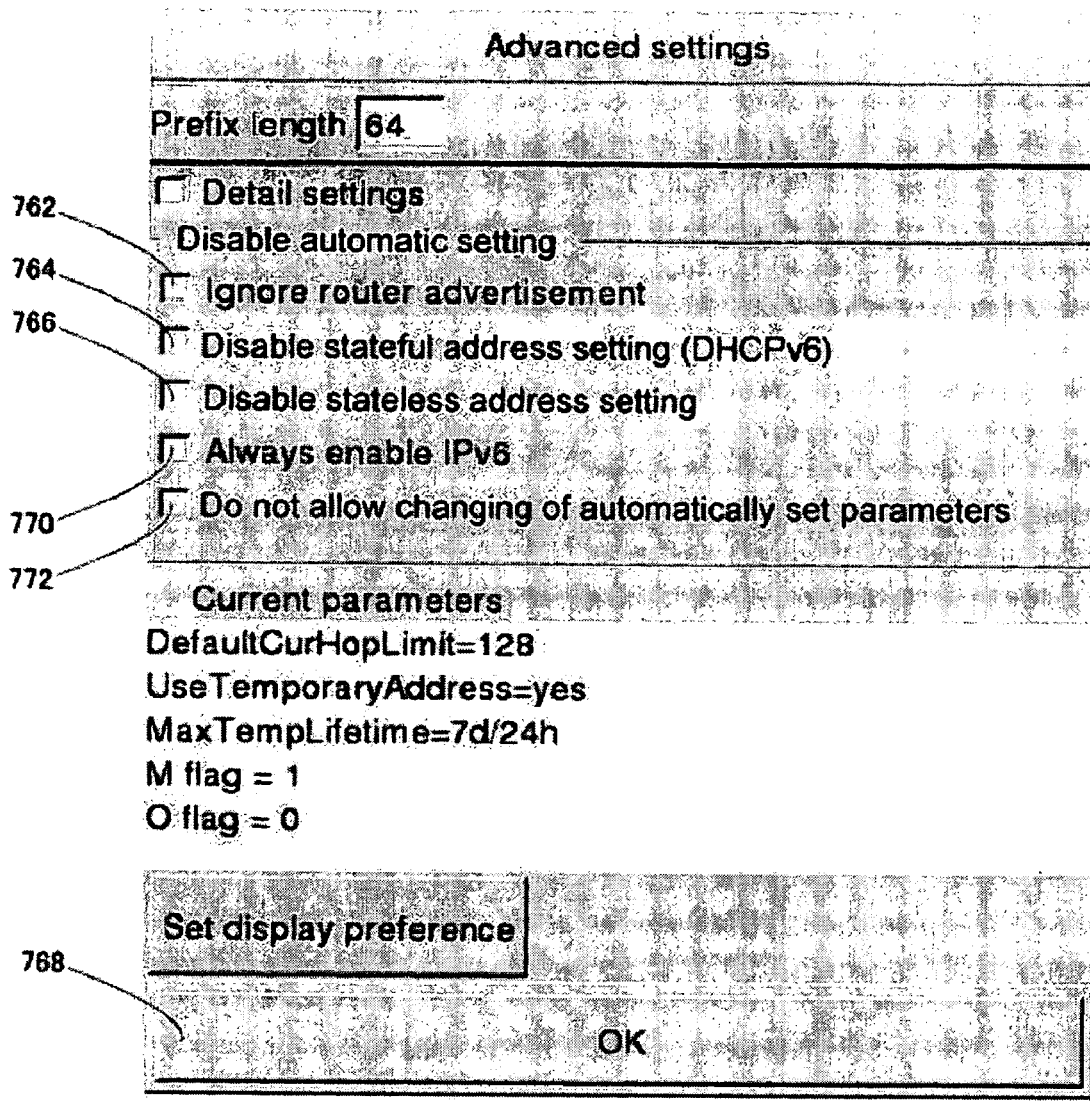
FIG. 13 is a screen image showing an advanced settings screen displayed by the PC according to illustrative aspects of the invention.

First, the PC 10_1 displays the aforementioned advanced settings screen on the display unit 17 (S332). As shown in FIG. 13, the advanced settings screen includes a check box 762 ("Ignore router advertisement") which is checked for ignoring RAs (Router Advertisements: information containing a prefix) transmitted from routers, a check box 764 ("Disable stateful address setting (DHCPv6)") which is checked for disabling the stateful address setting, a check box 766 ("Disable stateless address setting") which is checked for disabling the stateless address setting, a check box 770 ("Always enable IPv6") which is checked for ignoring settings negatively impacting normal IPv6 operation, a check box 772 ("Do not allow changing of automatically set parameters") which is checked for prohibiting the change of automatically set parameters, an OK button 768, etc. After the advanced settings screen has been displayed as above, the user can perform an operation for selecting (checking) each check box, an operation for selecting the OK button 768, etc. through the input unit 18.

After displaying the advanced settings screen as above, the PC 10_1 waits for an operation by the user (S334: NO). When an operation is performed by the user (S334: YES), if the operation is a selection of a check box (S336: YES), the PC 10_1 switches the check box to a selected state (to a non-selected state when the check box has already been selected) (S338) and returns to the step S334.

If the operation by the user in the step S334 is pressing the OK button 768 (S336: NO, S339: YES), the PC 10_1 instructs the management target device to change its settings based on the selection status of the check boxes at this point (S340) and thereafter returns to the step S204. Since RA ignorance information (indicating whether to ignore RAs (Router Advertisements: information containing a prefix) transmitted from routers) and the automatic setting validity information (indicating whether to enable or disable the automatic setting) have been registered in the database of the management target device, the PC 10_1 in the step S340 transmits a setting request to the management target device according to SNMP requesting the change (update) of the information according to the selection status of the check boxes. The management target device receiving the setting request updates the information according to the setting request and changes its settings accordingly based on the selection status of the check boxes. If the operation by the user in S334 is none of the above operations (S339: NO), the PC 10_1 executes a process corresponding to the operation (other process) (S342) and thereafter returns to the step S334.

Incidentally, when the operation by the user in the step S204 is pressing the "Hide" button 634 on the IPv6 settings screen shown in FIG. 9 (S330: NO), the PC 10_1 ends the IPv6 setting process and returns to the step S114 of FIG. 2.

(2) Received Data Process Executed by Printer 20

In the following, a received data process executed by (the CPU 21 of) each printer 20 will be explained referring to a flowchart of FIG. 14A. The received data process is started each time the printer 20 receives data via the network I/F 26.

First, the printer 20 checks whether the received data is a setting request according to SNMP (S602). If the received data is a setting request according to SNMP (S602: YES), the printer 20 executes a process corresponding to the request (SNMP process) (S604) and thereafter ends the received data process. In the SNMP process (S604), when the setting request is one requesting the update of the automatic setting validity information (enabling/disabling of the automatic setting function), the printer 20 updates the automatic setting validity information according to the request. When the setting request is one requesting the update of the router list (registration of an IP address in the router list), the printer 20 registers the IP address in the router list according to the request. When the setting request is one requesting the registration of an IP address in the database, the printer 20 registers the IP address in the database according to the request. When the setting request is one requesting the deletion of an IP address from the database, the printer 20 deletes the IP address from the database according to the request. When the setting request is one requesting the update of the IPv6 function validity information (enabling/disabling of the IPv6 data communication function), the printer 20 updates the IPv6 function validity information according to the request. Regular processes according to SNMP are also executed in this SNMP process (S604).

If the received data is not a setting request according to SNMP (S602: NO) but an RA transmitted from a router (S606: YES), the printer 20 executes a process corresponding to the RA (RA process) (S608) and thereafter ends the received data process.

Figure 14A:
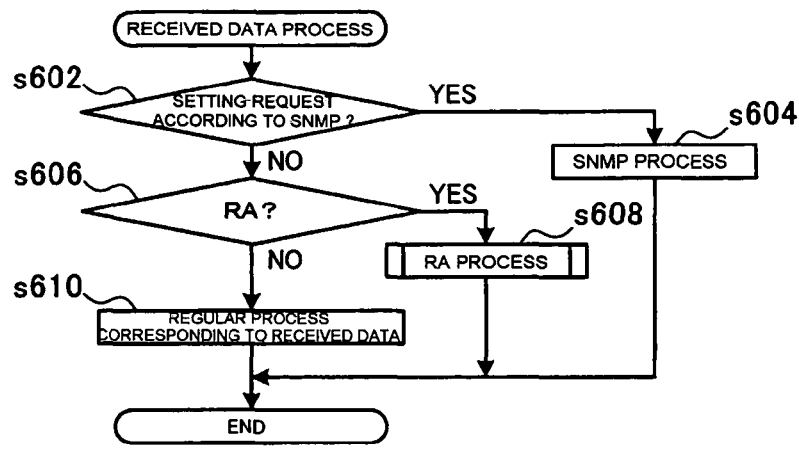
FIG. 14A is a flowchart showing a received data process executed by each printer in the setting management system according to illustrative aspects of the invention.
Figure 14B:
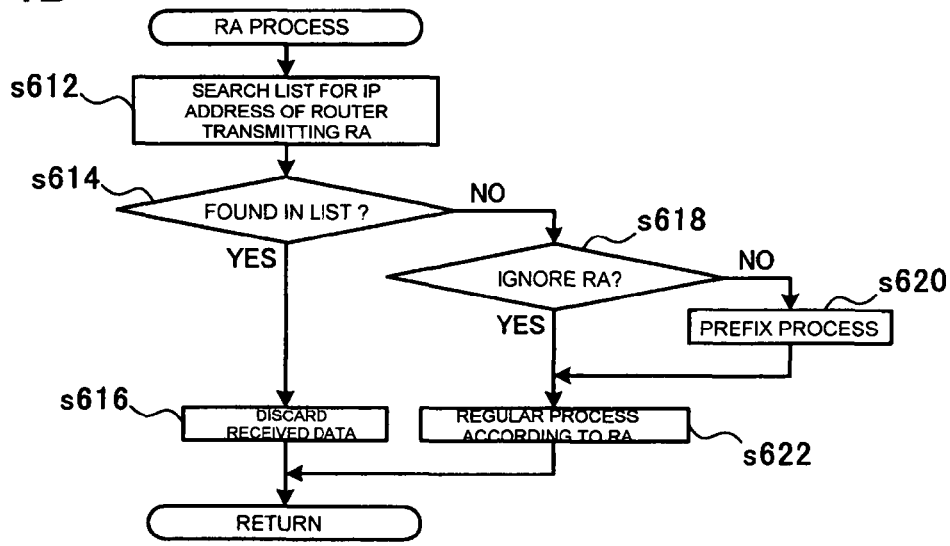
FIG. 14B is a flowchart showing an RA process executed by each printer according to illustrative aspects of the invention.

FIG. 14B is a flowchart showing the details of the RA process (S608 in FIG. 14A). The printer 20 searches the list in the database for the IP address of the router transmitting the RA (S612). If the IP address of the router is found in the list in the database (S614: YES), the printer 20 discards the received data (S616) and thereafter ends the RA process and the received data process.

If the IP address of the router is not found in the list in the database (S614: NO), the printer 20 checks whether the RA ignorance information in the database specifies the ignoring of RAs (S618). If the RA ignorance information does not specify the ignoring of RAs (S618: NO), the printer 20 executes a prefix process (generating and setting of an IP address) according to the prefix contained in the RA (S620), executes a regular process (other than the prefix process) according to the RA (S622), and ends the RA process and the received data process. On the other hand, if the RA ignorance information specifies the ignoring of RAs (S618: YES), the printer 20 executes the regular process according to the RA while skipping the prefix process (S622) and thereafter ends the RA process and the received data process.

Returning to FIG. 14A (received data process), if the received data is not an RA (S606: NO), the printer 20 executes a regular process corresponding to the received data (S610) and thereafter ends the received data process.

(3) Network Print Process

Figure 26:
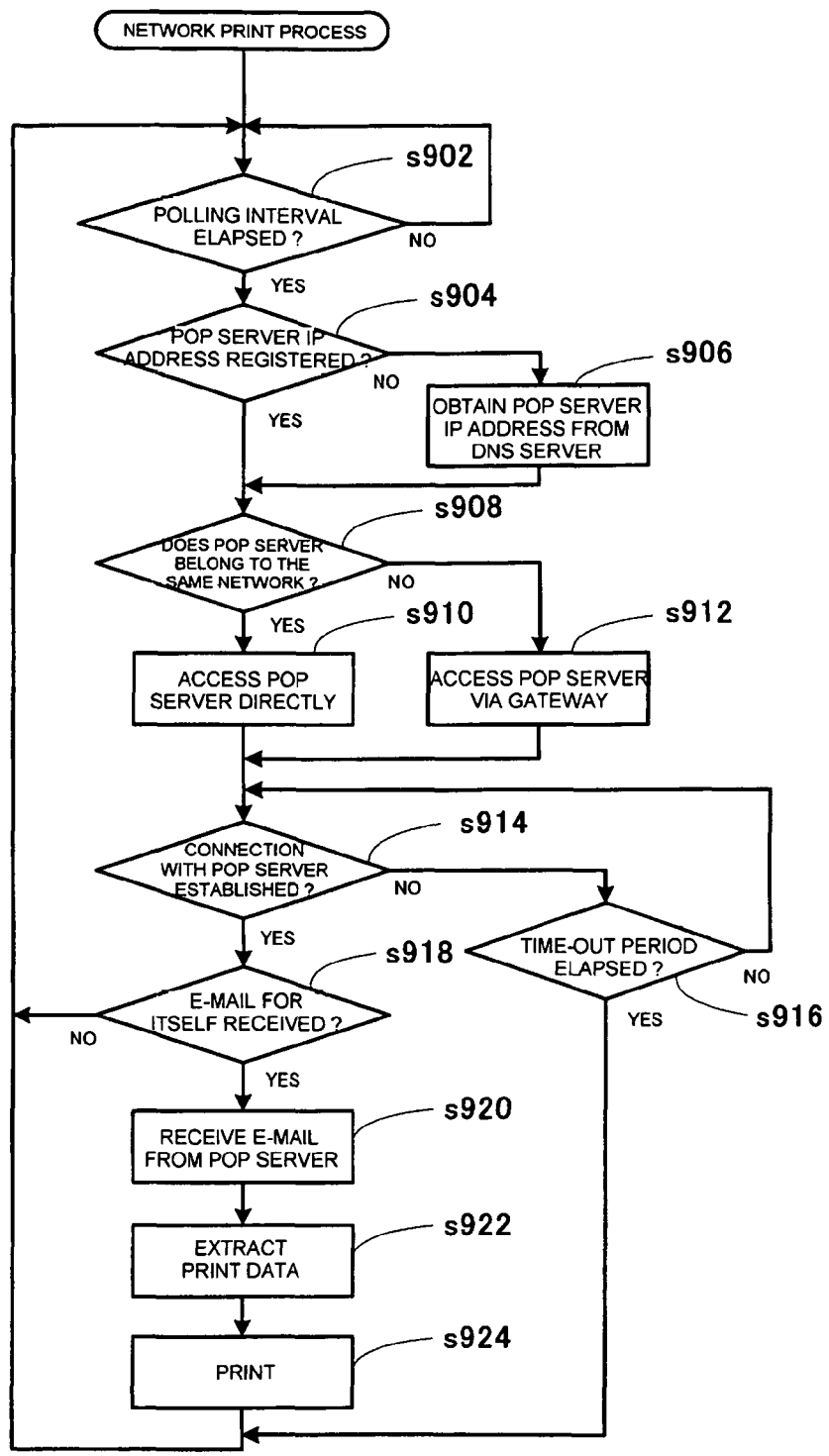
FIG. 26 is a flowchart showing a network print process executed by each printer having a network print function according to illustrative aspects of the invention.

In the following, the procedure of a network print process executed by each printer 20 having the aforementioned network print function will be described referring to a flowchart of FIG. 26. The network print process is executed repeatedly after the printer 20 having the network print function is started up.

First, the printer 20 waits until a prescribed polling interval (of polling from a POP server) elapses (S902: NO). In this illustrative embodiment, the printer 20 is configured to access to a POP server (the mail server 40 in this illustrative embodiment) at prescribed intervals in order to check whether or not an e-mail for the printer 20 has arrived. In the step S902, the printer 20 waits until the interval (polling interval) elapses.

When the polling interval has elapsed (S902: YES), the printer 20 checks whether an IP address of a POP server has already been registered as a character string in a format corresponding to the IP mode (IPv4 or IPv6) of the printer 20 (S904).

If no IP address of a POP server has been registered yet, that is, if not an IP address but the server name of a POP server has been registered (S904: NO), the printer 20 obtains the IP address of the POP server from the DNS server 50 based on the server name of the POP server (S906) and thereafter advances to the next step S908. Meanwhile, if an IP address of a POP server has already been registered (S904: YES), the printer 20 directly advances to the step S908 skipping the step S906.

Subsequently, the printer 20 checks whether the POP server identified by the registered IP address or the IP address obtained in S906 belongs to the same network as the printer 20 by comparing network addresses contained in IP addresses of the printer 20 and the POP server (S908).

If the POP server belongs to the same network as the printer 20 (S908: YES), the printer 20 directly accesses the POP server (S910), otherwise (S908: NO) the printer 20 accesses the POP server via the gateway 30 (S912).

Subsequently, the printer 20 waits until the connection with the POP server is established (within a prescribed time-out period) (S914: NO, S916: NO). If the time-out period elapses without the establishment of the connection (S916: YES), the process returns to the step S902. If the connection with the POP server is established within the prescribed time-out period (S914: YES), the printer 20 checks whether an e-mail for the printer 20 has been received by the POP server (S918).

If no e-mail for the printer 20 has been received by the POP server (S918: NO), the process returns to the step S902. If an e-mail for the printer 20 has been received by the POP server (S918: YES), the printer 20 receives the e-mail from the POP server (S920).

Subsequently, the printer 20 extracts print data from the received e-mail (S922), lets the printing unit 28 print out an image specified by the extracted print data (S924), and thereafter returns to the step S902.

In the first illustrative embodiment which has been described above, when the IP address entered in the selection window is designated by the user as an IP address to be added or deleted in the step S204 of FIG. 5 (S210: YES or S240: YES), the PC 10_1 is capable of presuming that a parameter should be changed together with the designated IP address (based on the setting function to be used for setting the IP address or the setting function that has been used for setting the IP address) and inform the user of the presence of such a parameter by displaying a confirmation message on the display unit 17 in the process from S226 of FIG. 6 or the process from S242 of FIG. 5. Therefore, the PC 10_1 can inform the user that another parameter closely related to the IP address designated by the user to be changed (added/deleted) should also be changed in conjunction with the IP address. Further, the user is allowed to change such a parameter (closely related to the IP address) easily by performing a selecting operation according to the information (confirmation message) displayed by the process.

Figure 7:
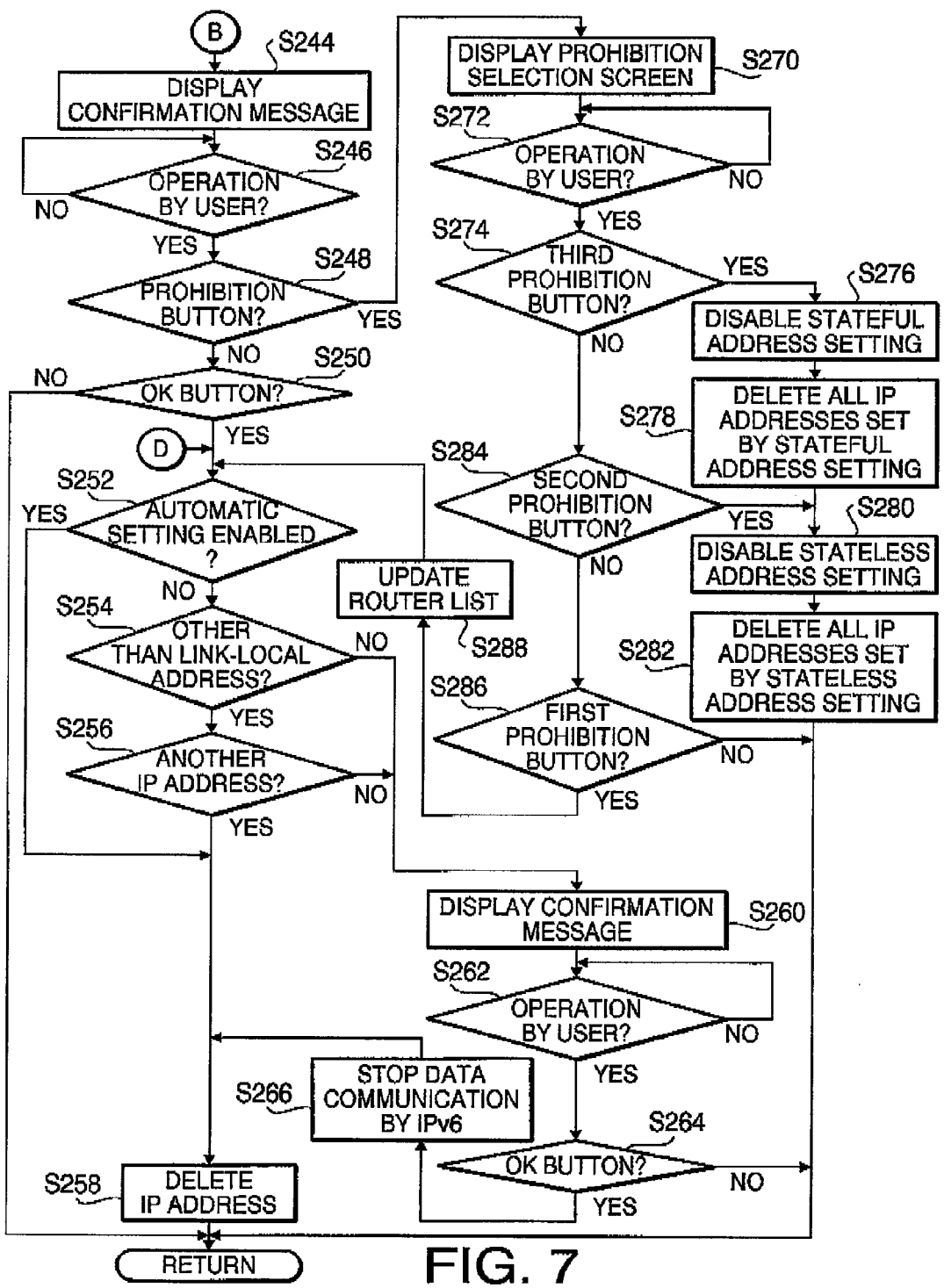
Figure 8A:
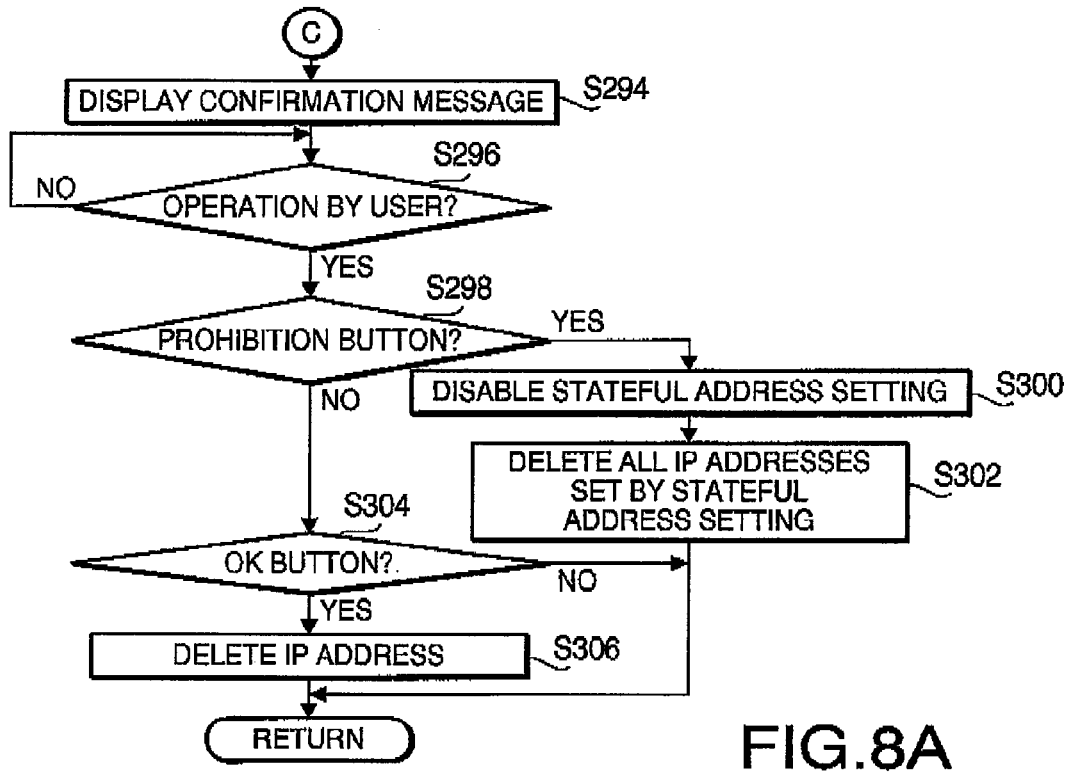
Figure 8B:
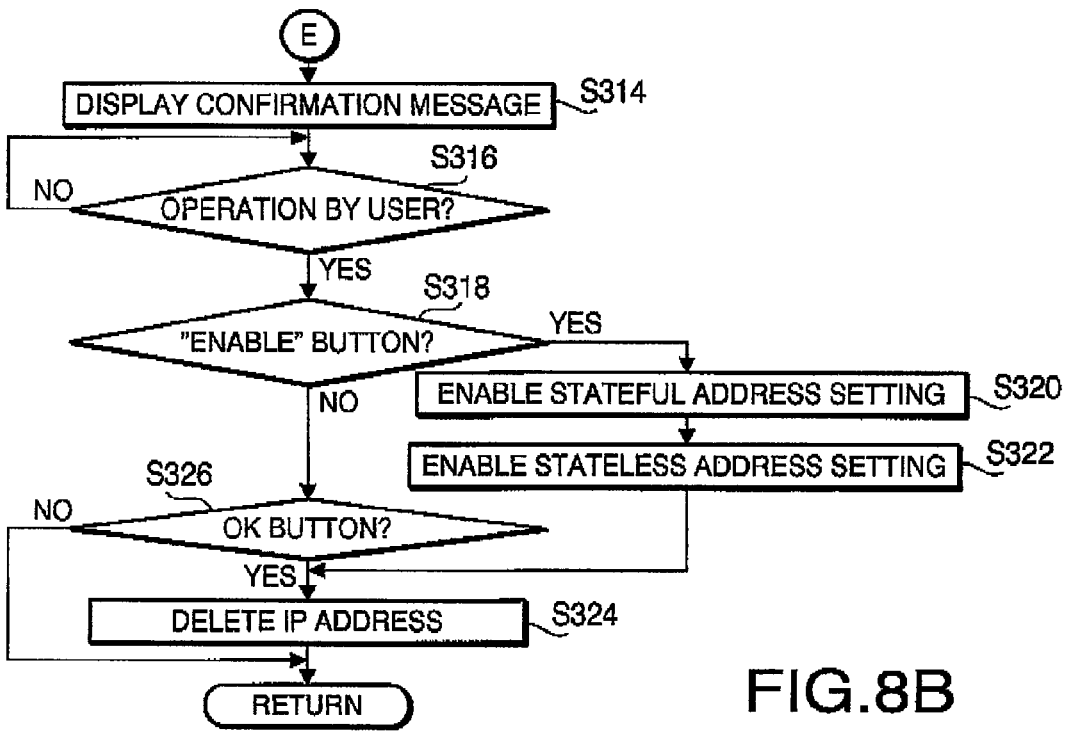

In the step S244 of FIG. 7 and the step S294 of FIG. 8A, the PC 10_1 presuming the intention of the user can inquire of the user whether the automatic setting function (stateless or stateful) used for setting the designated IP address should be prohibited, that is, inform the user that the automatic setting function should be prohibited (disabled). In the step S314 of FIG. 8B, the PC 10_1 presuming the intention of the user can inquire of the user whether a setting function other than the manual setting function used for setting the designated IP address should be enabled, that is, inform the user that the automatic setting function should be enabled.

When the IP address entered in the selection window is designated by the user as an IP address to be deleted (S240: YES), if the designated IP address has been set by the stateless address setting (S242: YES), the PC 10_1 can inquire of the user whether (disable) a similar setting function (stateful address setting) together with the stateless address setting should be prohibited in the step S244 of FIG. 7.

In the case (S242: YES) where the IP address entered in the selection window and designated by the user as an IP address to be deleted has been set by the stateless address setting, the PC 10_1 can inform the user that the acquisition of prefixes from a router corresponding to the IP address (i.e. the router that was used for generating the designated IP address as the source of the prefix) should be prohibited in the step S270 of FIG. 7. When the user selects the prohibition (by pressing the first prohibition button 732 shown in FIG. 12A), the PC 10_1 instructs the printer 20 (management target device) to update its router list in the step S288, by which the printer 20 stops obtaining the prefix from the router.

In the step S226 of FIG. 6, the PC 10_1 judges whether the IP address designated by the user to be added is valid (appropriate), and executes the process from step S228 (setting of the IP address, etc.) only when the designated IP address (character string) is valid. Therefore, even when the user erroneously enters a character string inappropriate for an IP address in the selection window, improper address setting to the printer 20 (management target device) according to the inappropriate character string can be avoided.

In cases where the judgment in the step S254 or S256 of FIG. 7 is "NO", the deletion of an IP address in the step S258 of FIG. 7 is executed necessarily with the stopping of data communication according to IPv6 (S266). While the process advances to the step S258 in response to the confirmation operation by the user (S262, S264) in these cases, the process directly advances to the step S258 and the user does not have to perform the confirmation operation when the automatic setting has been enabled (S252: YES) or when there exists another IP address already set to the management target device (S256: YES). For example, when another IP address has already been set to the management target device, the confirmation operation in not required and only the deletion of the designated IP address is carried out. As above, the confirmation operation by the user can be employed properly depending on the situation.

In the case where the judgment in the step S254 or S256 is "NO" (i.e. when the designated IP address is a link-local address, that is, an IP address indispensable for realizing data communication according to IPv6) or when no IP address other than the designated IP address has been set to the management target device), the PC 10_1 can inform the user that data communication according to IPv6 should be stopped (in response to the confirmation operation by the user) in the step S260 of FIG. 7.

Each management target device is provided with the database in which a variety of information on the device is registered, and the PC 10_1 can check the setting status of each management target device by inquiring of the management target device about the information registered in the database. Since the information indicating the setting status of each management target device is stored in each management target device, the PC 10_1 does not need to secure a storage area for storing the information.

Incidentally, while the above explanation has been given assuming that only the PC 10_1 (out of the PCs 10 in the setting management system) is equipped with the setting management program for executing the processes for the setting management, the setting management program may also be installed in two or more PCs 10 in the setting management system (e.g. the PCs 10_1 and 10_2) so that the PCs 10 can execute the setting management cooperatively, as long as information is properly shared among the PCs. Further, the management target devices are not limited to the printers 20; it is also possible to let the PC 10_1 manage a PC 10 in the setting management system as a management target device.

Illustrative Embodiment 2

In the following, a second illustrative embodiment in accordance with the present invention will be described. In the second illustrative embodiment, steps explained below are added between the steps S242 and S244 and between the steps S292 and S294 in the aforementioned IPv6 setting process. Since other steps are identical with those of the first illustrative embodiment, only the difference from the first illustrative embodiment will be explained referring to flowcharts of FIGS. 15 and 16. The process shown in FIG. 15 includes a new step S402 compared to the process of FIG. 7, while the process shown in FIG. 16 includes a new step S404 compared to the process of FIG. 8A.

Figure 15:
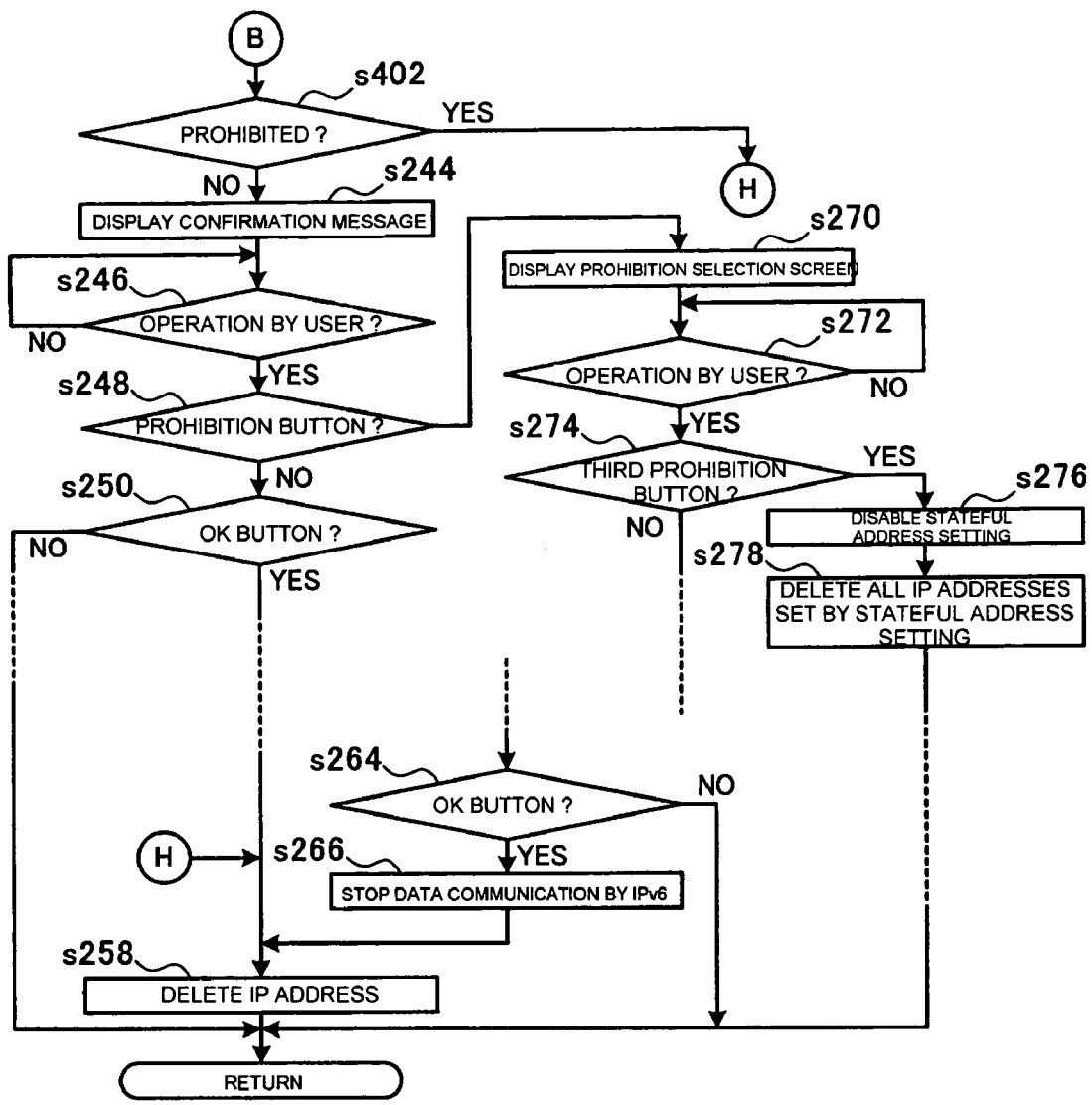
FIGS. 15 and 16 are flowcharts showing parts of the IPv6 setting process executed by the PC in accordance with aspects of a second illustrative embodiment of the present invention.

In the case where the IP address designated by the user to be deleted is one that has been set by the stateless address setting (S242: YES), the PC 10_1 checks whether the stateless address setting has been prohibited (S402) as shown in FIG. 15. In this step, the PC 10_1 checks the automatic setting validity information contained in the information obtained in the step S110 of FIG. 2 and judges that the stateless address setting has been prohibited if the automatic setting validity information indicates the disabling of the stateless address setting. Incidentally, this information regarding the stateless address setting can be changed in the step S340 of FIG. 5.

If the stateless address setting has not been prohibited (S402: NO), the process advances to the step S244 to display the aforementioned confirmation message. If the stateless address setting has been prohibited (S402: YES), the process directly advances to the step S258.

Figure 16:
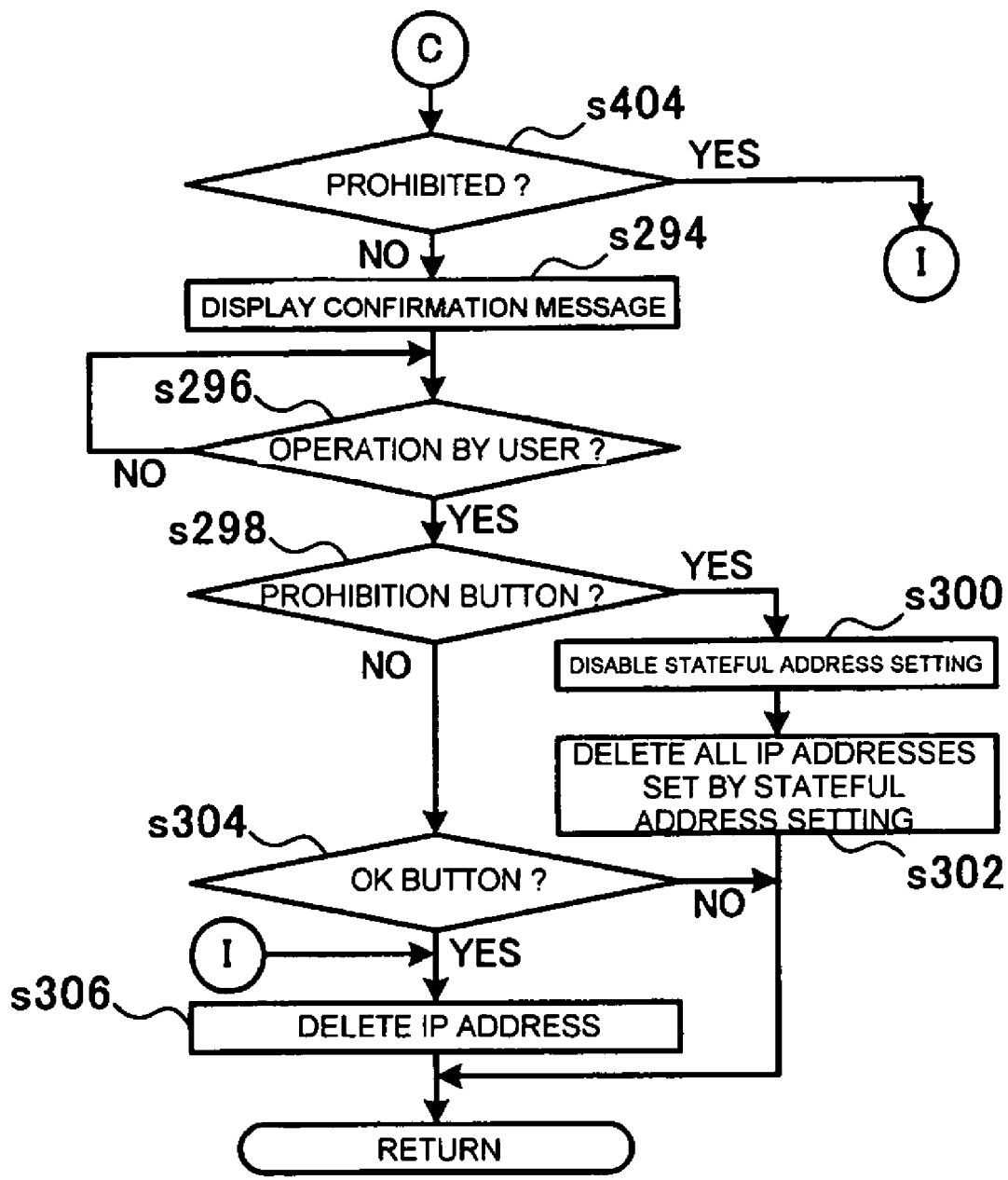

Meanwhile, in the case where the IP address designated by the user to be deleted is one that has been set by the stateful address setting (S292: YES), the PC 10_1 checks whether the stateful address setting has been prohibited (S404) as shown in FIG. 16. In this step, the PC 10_1 checks the automatic setting validity information contained in the information obtained in the step S110 of FIG. 2 and judges that the stateful address setting has been prohibited if the automatic setting validity information indicates the disabling of the stateful address setting. Incidentally, this information regarding the stateful address setting can also be changed in the step S340 of FIG. 5.

If the stateful address setting has not been prohibited (S404: NO), the process advances to the step S294 to display the aforementioned confirmation message. If the stateful address setting has been prohibited (S404: YES), the process directly advances to the step S306.

The PC 10_1 in the second illustrative embodiment can achieve the following effects in addition to the effects described in the first illustrative embodiment.

In cases where the stateless address setting or the stateful address setting has been disabled (prohibited) in the step S402 or S404, the IP address designated by the user is deleted immediately, skipping the following selecting operation (confirmation operation) by the user. Since the judgment on whether the stateless/stateful address setting has been prohibited is made based on the information changed by the user in the steps S332-S340 of FIG. 5, the user can prevent the parameters from being changed in the steps S244-S266 or in the steps S294-S304 by selecting the prohibition (disabling) of the stateless address setting or the stateful address setting in the steps S332-S340 as needed.

Illustrative Embodiment 3

In the following, a third illustrative embodiment in accordance with the present invention will be described. In the third illustrative embodiment, steps explained below are added between the steps S242 and S244 and between the steps S292 and S294 in the aforementioned IPv6 setting process. Since other steps are identical with those of the first illustrative embodiment, only the difference from the first illustrative embodiment will be explained referring to flowcharts of FIGS. 17 and 18. The process shown in FIG. 17 includes a new step S412 compared to the process of FIG. 7, while the process shown in FIG. 18 includes a new step S414 compared to the process of FIG. 8A.

Figure 17:
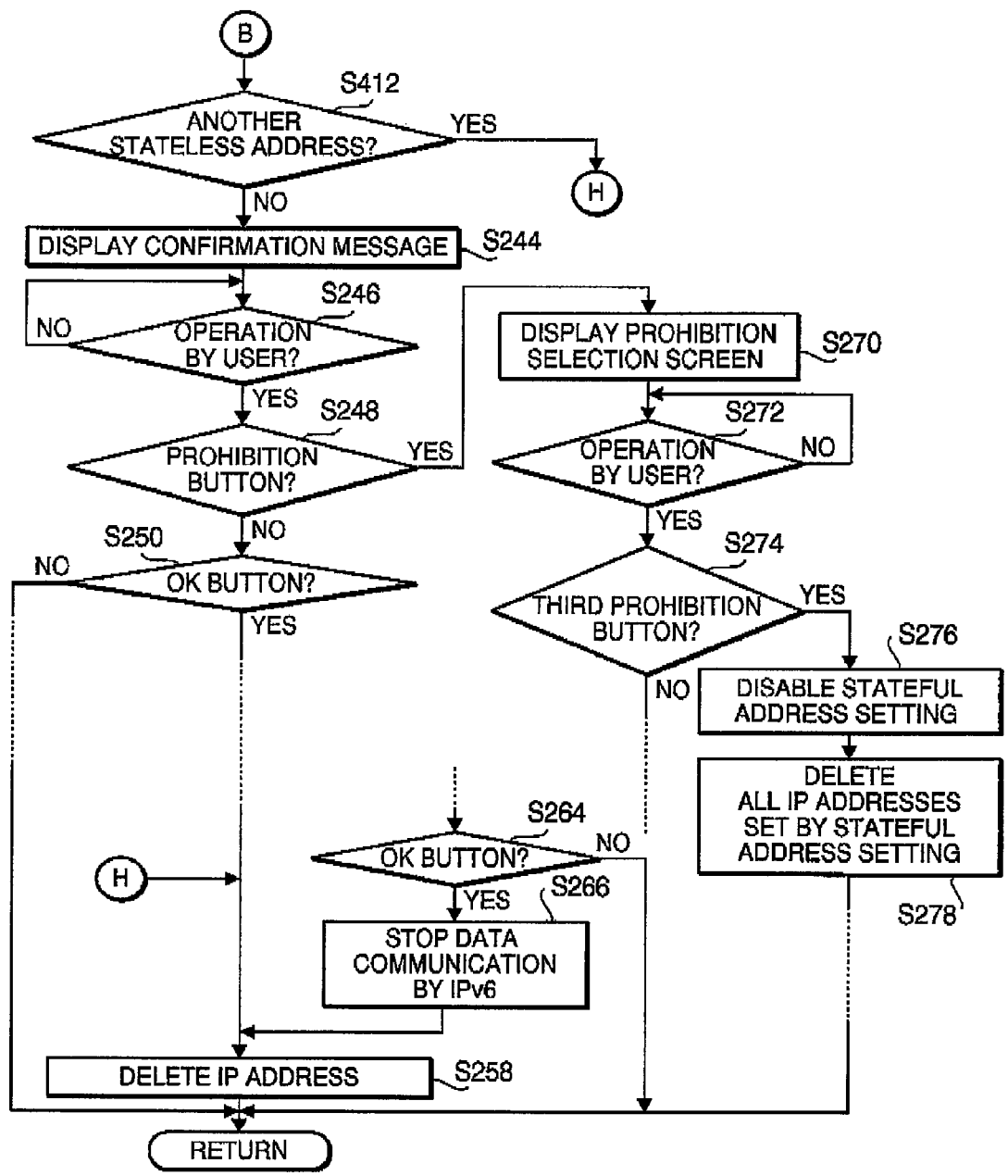
FIGS. 17 and 18 are flowcharts showing parts of the IPv6 setting process executed by the PC in a third illustrative embodiment of the present invention according to illustrative aspects of the invention.

In the case where the IP address designated by the user to be deleted is one that has been set by the stateless address setting (S242: YES), the PC 10_1 checks whether there exists a stateless address (an IP address set by the stateless address setting) set to the management target device other than the IP address entered in the selection window 612 (S412) as shown in FIG. 17. In this step, the PC 10_1 judges that another stateless address has been set to the management target device if the information obtained in the step S110 of FIG. 2 indicates that there exists another IP address set to the management target device (other than the IP address to be deleted) that has been associated with information indicating the stateless address setting.

If no other stateless address has been set to the management target device (S412: NO), the process advances to the step S244 to display the aforementioned confirmation message. If another stateless address has been set to the management target device (S412: YES), the process directly advances to the step S258.

Figure 18:
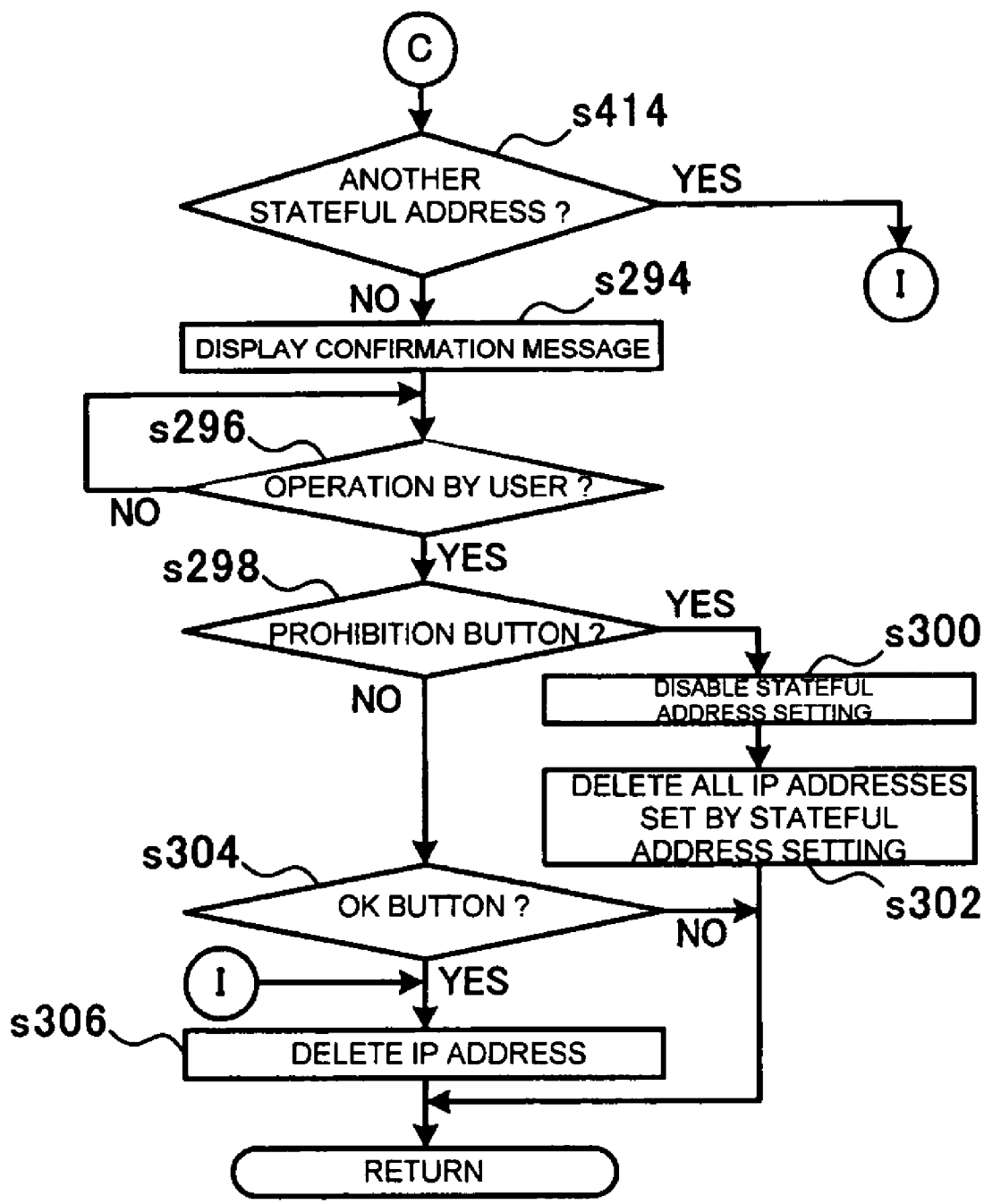

Meanwhile, in the case where the IP address designated by the user to be deleted is one that has been set by the stateful address setting (S292: YES), the PC 10_1 checks whether there exists a stateful address (an IP address set by the stateful address setting) set to the management target device other than the IP address entered in the selection window 612 (S414) as shown in FIG. 18. In this step, the PC 10_1 judges that another stateful address has been set to the management target device if the information obtained in the step S110 of FIG. 2 indicates that there exists another IP address set to the management target device (other than the IP address to be deleted) that has been associated with information indicating the stateful address setting.

If no other stateful address has been set to the management target device (S414: NO), the process advances to the step S294 to display the aforementioned confirmation message. If another stateful address has been set to the management target device (S414: YES), the process directly advances to the step S306.

The PC 10_1 in the third illustrative embodiment can achieve the following effects in addition to the effects described in the first illustrative embodiment.

In cases where another stateless/stateful address has been set to the management target device in the step S412 or S414, the IP address designated by the user is deleted immediately, skipping the following selecting operation (confirmation operation) by the user. In such a case where another IP address has already been set to the management target device by the same setting function, settings (parameters) that are going to be changed in the following steps by receiving a selection by the user are likely to have already been made (set) properly at this point. In this case, few problems are expected to occur even if subsequent steps are executed without letting the user make the selection. By leaving out the selection by the user as above when the settings are presumed to have already been made properly, the user is relieved of the need of performing useless operations.

Other Aspects

While a description has been given above of illustrative embodiments in accordance with the present invention, the present invention is not to be restricted by the particular illustrative embodiments and a variety of modifications, design changes, etc. are possible without departing from the scope and spirit of the present invention described in the appended claims.

For example, while the setting management system in the above illustrative embodiments includes PCs 10 and printers 20 as "devices" in the present invention, the "devices" can include any type of devices (scanners, network cameras, facsimile machines, copiers, projectors, sewing machines, network telephones, audio-visual equipment, network storage devices, MFPs (Multi Function Peripherals), etc.) delivering performance while being connected to a network.

While the above explanation of the illustrative embodiments has been given assuming that the PC 10_1 executes the remote setup to a printer 20, the PC 10_1 may also be configured to set itself similarly to the above illustrative embodiments. It is also possible to configure a printer 20 to make settings via its user I/F 27.

While the PC 10_1 in the IPv6 setting process in the above illustrative embodiments transmits an instruction (a setting request for requesting the setting of a parameter) to the management target device each time an operation is performed by the user for parameter setting, it is also possible to configure the PC 10_1 to accumulate the contents of such operations performed in the IPv6 setting process (parameters designated by the user) and thereafter transmit an instruction (a setting request for requesting the setting of the parameters) to the management target device in a lump in the step S128 of FIG. 2.

In the above illustrative embodiments, when the IP address entered in the selection window is designated by the user as an IP address to be deleted (S240 of FIG. 5), the confirmation message inquiring whether to also prohibit (disable) a similar setting method (stateful address setting) is displayed (S244 of FIG. 7) only when the designated IP address has been set by the stateless address setting (S242: YES). However, it is also possible to let the PC 10_1 display a similar confirmation message inquiring whether to also prohibit a similar setting method (stateless address setting) when the designated IP address has been set by the stateful address setting (S292: YES). Such an operation can be realized by letting the PC 10_1 execute a process similar to that of FIG. 7 instead of the process of FIG. 8A.

While a message (the prohibition selection screen) informing the user that the acquisition of the prefix from a particular router should be prohibited is displayed in the step S270 of FIG. 7 as an example of "disabling part of the automatic setting function" in the above illustrative embodiments, other items may also be employed as the "disabling part of the automatic setting function".

In the above illustrative embodiments, when an IP address to be added is entered in the input window 651 of the input dialog by the user (S214 of FIG. 6), not only the setting function for setting the IP address (the setting function indicated by the character string added to the IP address) but both the automatic setting functions (stateless, stateful) are enabled in the step S220 of FIG. 6. However, the step S220 may also be configured to enable only the setting function for setting the IP address.

When an IP address to be added is entered in the input window 651 of the input dialog by the user (S214 of FIG. 6) and the character string read in S216 is judged to contain a character string indicating a setting function (S218: YES), the automatic setting is enabled immediately in the step S220 of FIG. 6 in the above illustrative embodiments. However, in the case where the character string read in S216 contains a setting function (S218: YES), the PC 10_1 (presuming that a setting function similar to the one indicated by the character string should also be enabled) may also inform the user that the similar setting function should also be enabled (or inquire of the user whether the similar setting function should be enabled), receive a confirmation operation from the user, and thereafter advance to the step S220 of FIG. 6.

By the above configuration, when an IP address and a setting function are designated by the user to be added, the PC 10_1 can inform the user that the similar setting function (similar to the designated-setting function) should also be enabled (or inquire of the user whether the similar setting function should be enabled).

In the above illustrative embodiments, in the case where an IP address and a setting function are designated by the user to be added (S218: YES), if the designated setting function is the stateless address setting (generating an IP address using a prefix obtained from a router) and an IP address of a router is also designated by the user (S222: YES), the router list of the printer 20 (management target device) is immediately updated (so that prefixes from the router will be received) in the step S224 of FIG. 6. However, in the case where an IP address of a router is also designated (S222: YES), the PC 10_1 may also inform the user that the prefix from the router should be obtained, receive a confirmation operation from the user (or inquire of the user whether the prefix from the router should be obtained), and thereafter advance to the step S224 of FIG. 6.

By the above configuration, when an IP address and a setting function (including an IP address of a router) are designated by the user to be added, if the designated setting function is the stateless address setting, the PC 10_1 can inform the user that the acquisition of the prefix from the router (designated together with the setting function) should be enabled (or inquire of the user whether the acquisition of the prefix from the router should be enabled).

While whether the IP address designated by the user is valid is judged in the step S226 of FIG. 6 in the above illustrative embodiments, such a judgment may also be made similarly in other parts of the process related to an entry of an IP address by the user (between S222 and S224, for example).

While the data communication according to IPv6 is stopped in the step S266 of FIG. 7 under the condition ("stoppage condition") that the IP address designated by the user to be deleted is a link-local address (an IP address indispensable for realizing data communication according to IPv6) (S254: NO) or that no IP address other than the designated IP address has been set to the management target device (S256: NO) in the above illustrative embodiments, the "stoppage condition" may also be set differently.

While a variety of information is stored in (registered in the database of) each management target device and the PC 10_1 checks the setting status of each management target device by inquiring of the management target device about the information registered in the database in the above illustrative embodiments, the PC 10_1 may also be configured to collect all the information that should be stored in the management target devices and manage the collected information. For example, the PC 10_1 may transmit each instruction (setting request) to the management target device in a format requesting no registration in the database, while storing the contents of each instruction in its storage area (e.g. the RAM 13 or the hard disk 14) so that the stored information can be used later for the check on the setting status of the management target device.

By the above configuration, the setting information on the management target devices can be stored in the PC 10_1, by which it is possible to eliminate the need of securing a storage area for the database in each management target device.

The IPv6 setting process in the above illustrative embodiments (FIGS. 5-8B) may also be configured to return to the step S204 of FIG. 5 except when the "Hide" button 634 is pressed.

While routers that should not be used as the source of the prefix are registered in the "prohibited router list" and the acquisition of the prefix from the routers registered in the list is prohibited in the above illustrative embodiments, it is also possible to register routers that may be used as the source of the prefix in a different type of router list ("permitted router list") and prohibit the acquisition of the prefix from routers not registered in the list. In this case, in the step S224 of FIG. 6, the PC 10_1 instructs the management target device to add the IP address contained in the character string read in S216 to the permitted router list. Meanwhile, in the step S288 of FIG. 7, the PC 10_1 instructs the management target device to delete the IP address of a router (as the source of the prefix used for the setting (generation) of the IP address entered in the selection window 612) from the permitted router list. It is also possible to let each management target device prepare both the prohibited router list (in which routers that should not be used as the source of the prefix are registered) and the permitted router list (in which routers that may be used as the source of the prefix are registered) and judge whether to obtain each prefix based on the two lists, by which acquisition of unnecessary prefixes can be prevented more securely.

Figure 19:
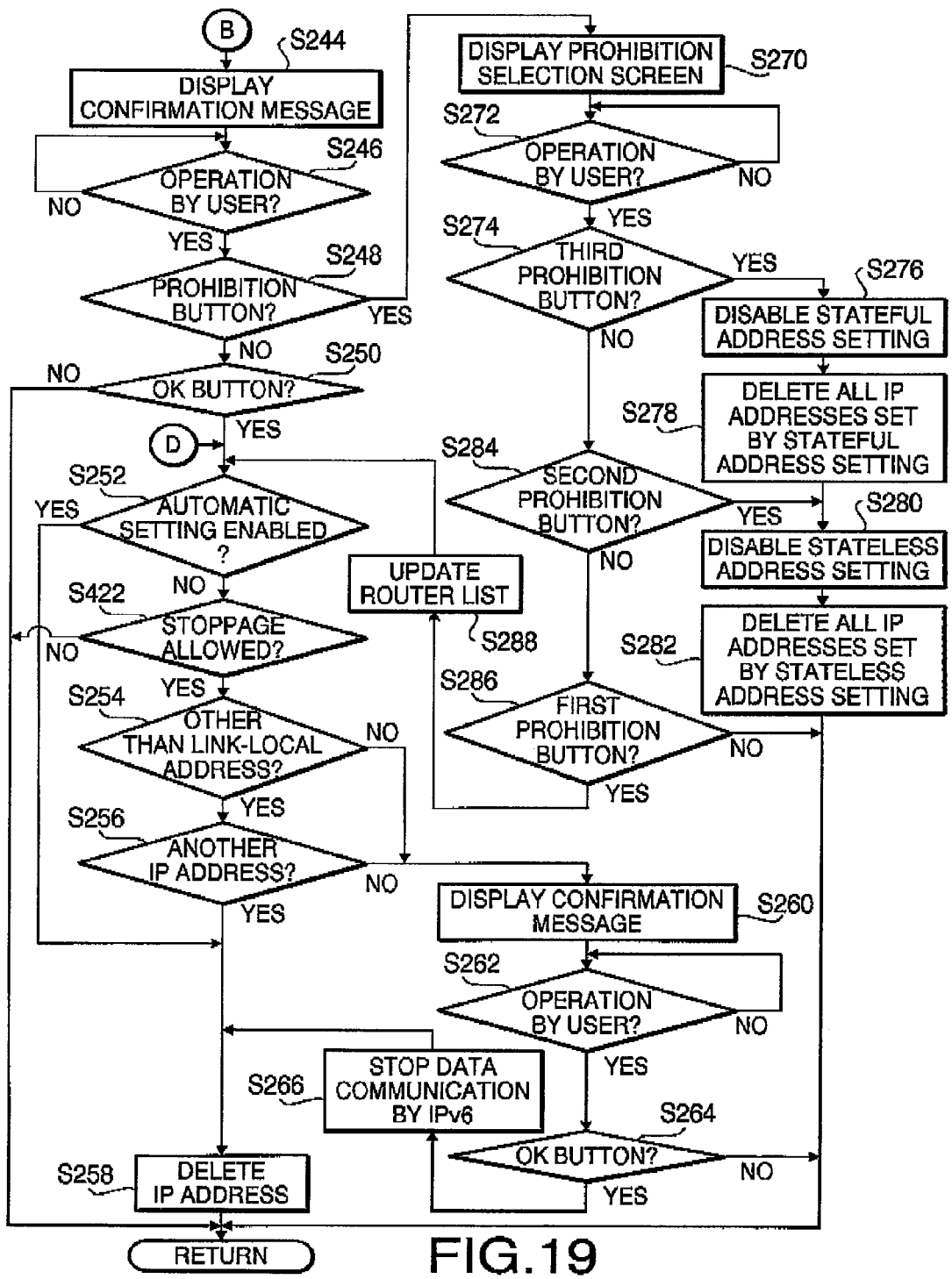
FIG. 19 is a flowchart showing a modification of a part of the IPv6 setting process according to illustrative aspects of the invention.

While data communication according to IPv6 is stopped in the step S266 of FIG. 7 when the judgment of S254 or S256 is "NO" (and the OK button 722 is pressed by the user) in the above illustrative embodiments, it is also possible to previously set each management target device regarding whether to stop the IPv6 data communication. In this case, the IPv6 data communication is stopped in the step S266 only when the setting has been made in the management target device. Specifically, information indicating whether to allow the stoppage of IPv6 data communication is previously registered in the database of the management target device, and the PC 10_1 obtains the information in the step S110 of FIG. 2. The information can be changed arbitrarily by the PC 10_1 transmitting a request according to SNMP. When the judgment in S252 of FIG. 7 is "YES", the PC 10_1 before advancing to S254 checks whether the stoppage of IPv6 data communication has been allowed in the management target device based on the information obtained in S110 of FIG. 2 (S422) as shown in FIG. 19. If the stoppage has been allowed (S422: YES), the process advances to S254, otherwise (S422: NO) the process advances to S258 (or S114 of FIG. 2) skipping S254-S266.

With the above configuration, the stoppage of IPv6 data communication occurring when the judgment of S254 or S256 is "NO" (and the OK button 722 is pressed by the user) can be prohibited by previously setting the management target device to not allow stoppage.

In the above embodiments, the steps for changing various parameters (S340 of FIG. 5, S220, S224, S236 and S238 of FIG. 6, S258, S266 and S276-S282 of FIG. 7, S300, S302 and S306 of FIG. 8A, S320, S322 and S324 of FIG. 8B) may also be configured to allow for some type of restriction (prohibiting the change itself, permitting part of the change, etc.). For example, the changing of a parameter (that has been set by the user operating the input unit 18) may be restricted when the management target device has received an instruction to restrict the change of the particular parameter from the PC 10_1 (according to SNMP, etc.). For this purpose, the steps for changing parameters may be modified as shown in FIG. 20.

Figures 20, 21:
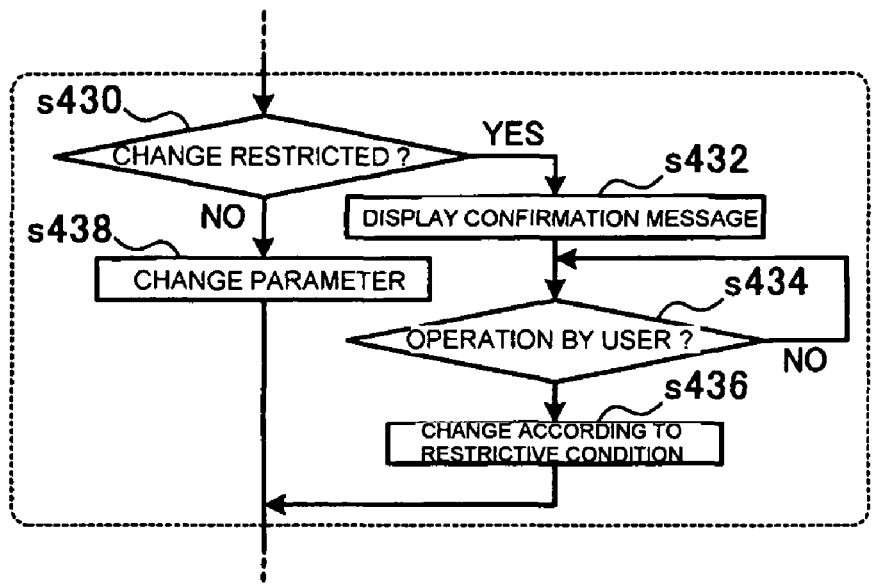
FIG. 20 is a flowchart showing a modification of each step for changing a parameter according to illustrative aspects of the invention.
FIG. 21 is a schematic diagram showing a confirmation message indicating that the change of a parameter has been prohibited according to illustrative aspects of the invention.

Referring to FIG. 20, the PC 10_1, which has obtained information regarding the restriction of changing the parameters in the step S110 of FIG. 2, checks whether the change of a parameter designated by the user has been restricted based on the information obtained in S110 (S430). If the change has been restricted (S430: YES), the PC 10_1 displays a confirmation message (indicating that the change has been restricted) on the display unit 17 (S432). FIG. 21 shows an example of the confirmation message (indicating that the change itself has been prohibited). Thereafter, the PC 10_1 waits for a confirmation operation (the pressing of the OK button) by the user (S434: NO). When the confirmation operation is performed by the user (S434: YES), the PC 10_1 changes the parameter according to the restrictive condition (S436). If the change has not been restricted in the step S430 (S430: NO), the PC 10_1 changes the parameter as in the above illustrative embodiments (S438).

By the above configuration, a parameter change that has been arbitrarily designated by the user to be restricted (about which the management target device has been informed) can be restricted by the management target device.

Figure 22:
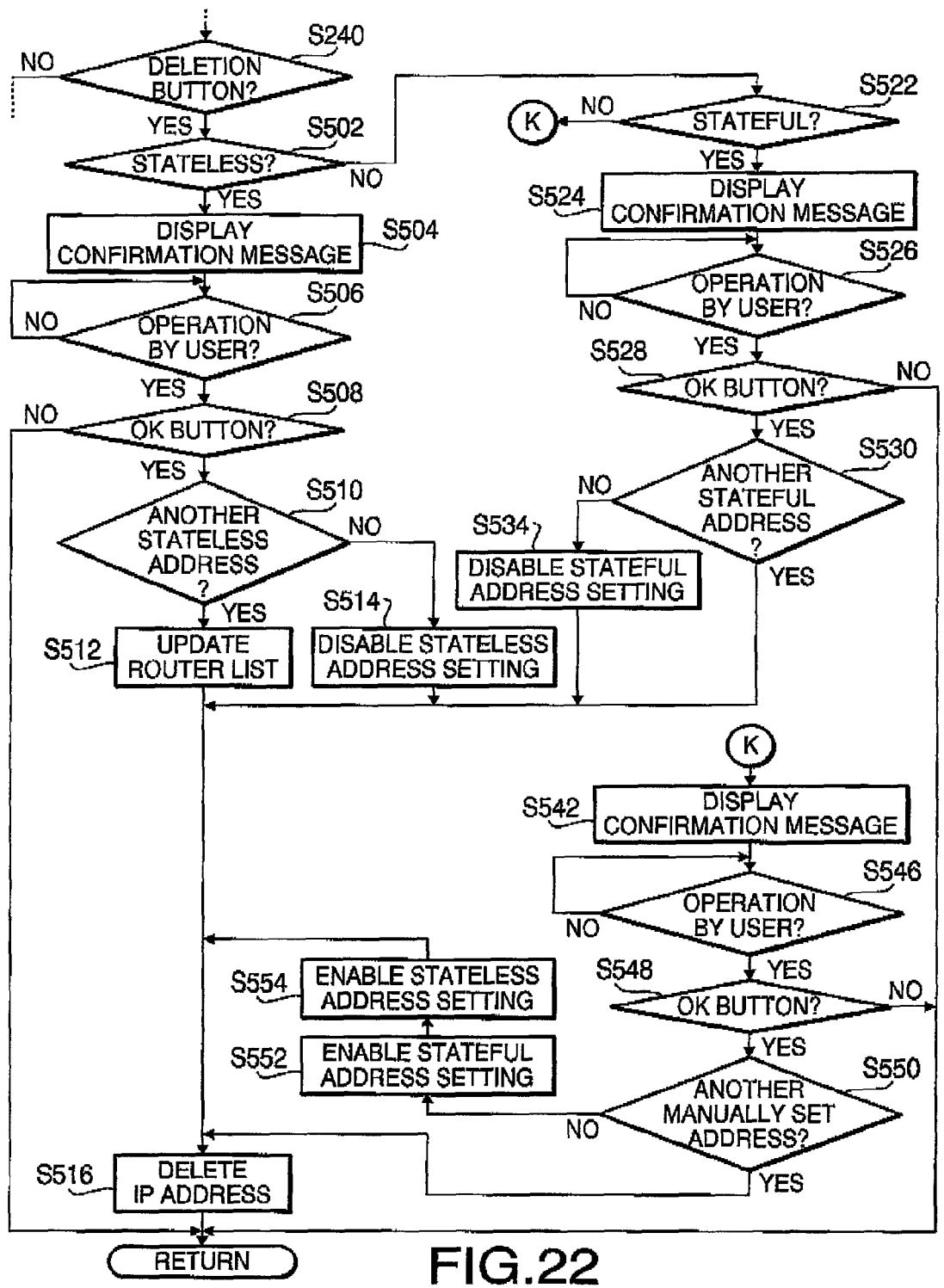
FIG. 22 is a flowchart showing a modification of a part of the IPv6 setting process according to illustrative aspects of the invention.

In the above illustrative embodiments, steps executed when the deletion button is pressed in the IPv6 setting process may also be simplified as shown in FIG. 22.

Referring to FIG. 22, when the judgment in the step S240 is "YES", the PC 10_1 checks whether the setting function corresponding to the IP address entered in the selection window 612 at the point when the deletion button 616 was pressed (the setting function associated with the IP address obtained in the step S110 of FIG. 2) is the stateless address setting (S502) similarly to S242 of FIG. 2.

Figure 23A:
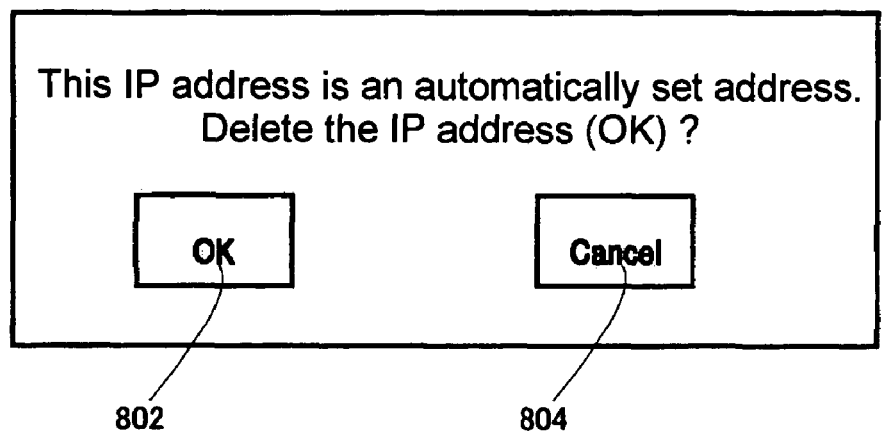
FIG. 23A is a schematic diagram showing an automatic setting notification screen displayed by the PC according to illustrative aspects of the invention.

If the setting function is judged to be the stateless address setting (S502: YES), the PC 10_1 displays a confirmation message (allowing the user to recognize that the IP address has been set automatically) on the display unit 17 (S504). In this step, the PC 10_1 displays an automatic setting notification screen (with the confirmation message for informing the user that the IP address is an automatically set address) on the display unit 17 as shown in FIG. 23A. The automatic setting notification screen includes an OK button 802 and a "Cancel" button 804 in addition to the confirmation message. After the automatic setting notification screen has been displayed as above, the user can perform an operation for selecting the button 802 or 804 through the input unit 18.

After displaying the confirmation message as above, the PC 10_1 waits for an operation by the user (S506: NO). When an operation is performed by the user (S506: YES), if the operation is pressing the "Cancel" button 804 (S508: NO), the PC 10_1 ends the IPv6 setting process and returns to the step S114 of FIG. 2.

If the operation by the user is pressing the OK button 802 (S508: YES), the PC 10_1 checks whether another stateless address (IP address set by the stateless address setting) has already been set to the management target device (S510) similarly to S412 of FIG. 17.

If another stateless address has been set to the management target device (S510: YES), the PC 10_1 instructs the management target device to update the router list (see FIG. 10) based on the IP address of the router as the source of the prefix used for generating the IP address entered in the selection window 612 at the point when the deletion button 616 was pressed (S512) similarly to S288 of FIG. 7.

If no other stateless address has been set to the management target device (S510: NO), the PC 10_1 instructs the management target device to disable the stateless address setting (S514) similarly to S280 of FIG. 7.

After finishing the step S512 or S514, the PC 10_1 instructs the management target device to delete the IP address that had been entered in the selection window 612 at the point when the deletion button 616 was pressed (S516) similarly to S258 of FIG. 7, ends the IPv6 setting process, and returns to the step S114 of FIG. 2.

If the setting function is judged not to be the stateless address setting in the step S502 (S502: NO), the PC 10_1 checks whether the setting function is the stateful address setting (S522) similarly to S292 of FIG. 2.

If the setting function is judged to be the stateful address setting (S522: YES), the PC 10_1 displays a confirmation message similar to that in S504 (see FIG. 23A) on the display unit 17 (S524).

After displaying the confirmation message as above, the PC 10_1 waits for an operation by the user (S526: NO). When an operation is performed by the user (S526: YES), if the operation is pressing the "Cancel" button 804 (S528: NO), the PC 10_1 ends the IPv6 setting process and returns to the step S114 of FIG. 2.

If the operation by the user is pressing the OK button 802 (S528: YES), the PC 10_1 checks whether another stateful address (IP address set by the stateful address setting) has already been set to the management target device (S530) similarly to S414 of FIG. 18.

If no other stateful address has been set to the management target device (S530: NO), the PC 10_1 instructs the management target device to disable the stateful address setting (S534) similarly to S276 of FIG. 7.

After finishing the step S534 or when another stateful address has been set to the management target device (S530: YES), the PC 10_1 advances to the step S516 and instructs the management target device to delete the IP address that had been entered in the selection window 612 at the point when the deletion button 616 was pressed.

Figure 23B:
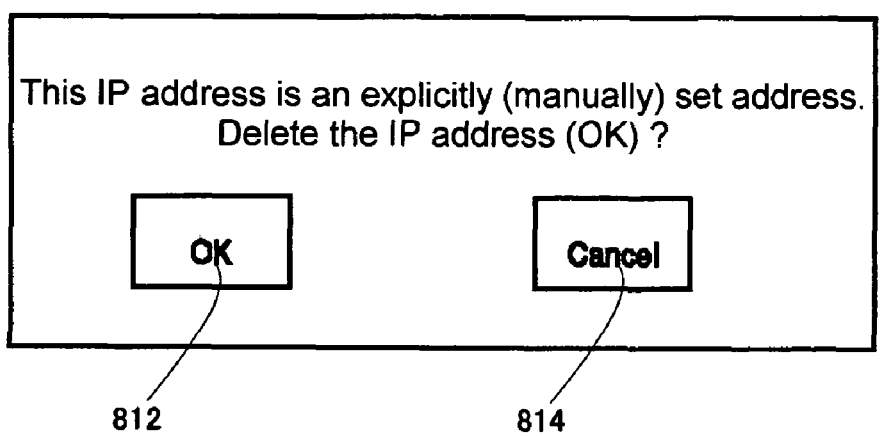
FIG. 23B is a schematic diagram showing a confirmation screen displayed by the PC according to illustrative aspects of the invention.

If the setting function is judged not to be the stateful address setting in the step S522 (S522: NO), the PC 10_1 displays a confirmation message (allowing the user to recognize that the IP address has been set explicitly (manually)) on the display unit 17 (S542). In this step, the PC 10_1 displays a confirmation screen (with the confirmation message informing the user that the IP address is an explicitly (manually) set address) on the display unit 17 as shown in FIG. 23B. The confirmation screen includes an OK button 812 and a "Cancel" button 814 in addition to the confirmation message. After the confirmation screen has been displayed as above, the user can select the button 812 or 814 through the input unit 18.

After displaying the confirmation message as above, the PC 10_1 waits for an operation by the user (S546: NO). When an operation is performed by the user (S546: YES), if the operation is pressing the "Cancel" button 814 (S548: NO), the PC 10_1 ends the IPv6 setting process and returns to the step S114 of FIG. 2.

If the operation by the user is pressing the OK button 812 (S548: YES), the PC 10_1 checks whether another manually set address has already been set to the management target device (S550). In this step, the PC 10_1 judges that another manually set address has already been set to the management target device if the information obtained in the step S110 of FIG. 2 indicates that there exists another IP address set to the management target device (other than the IP address to be deleted) associated with information indicating the manual setting.

If no other manually set address has been set to the management target device (S550: NO), the PC 10_1 instructs the management target device to enable the stateful address setting (S552) similarly to S320 of FIG. 8, instructs the management target device to enable the stateless address setting (S554) similarly to S322 of FIG. 8, and advances to the step S516 to instruct the management target device to delete the IP address that had been entered in the selection window 612 at the point when the deletion button 616 was pressed.

If another manually set address has been set to the management target device (S550: YES), the PC 10_1 advances to the step S516 without executing the steps S552 and S554.

While the PC 10_1 in the step S128 of FIG. 2 instructs the management target device to set all the parameters (hereinafter also referred to as "usage parameters") entered in the input windows on all the subscreens of the setting screen, such a setting instruction may also be issued regarding parameters corresponding to the IP mode of the management target device (i.e. depending on whether the management target device has been configured to execute communication according to IPv4 only, IPv6 only, or both IPv4/IPv6). For this purpose, the step S128 of FIG. 2 may be modified as shown in FIG. 24.

Figure 24:
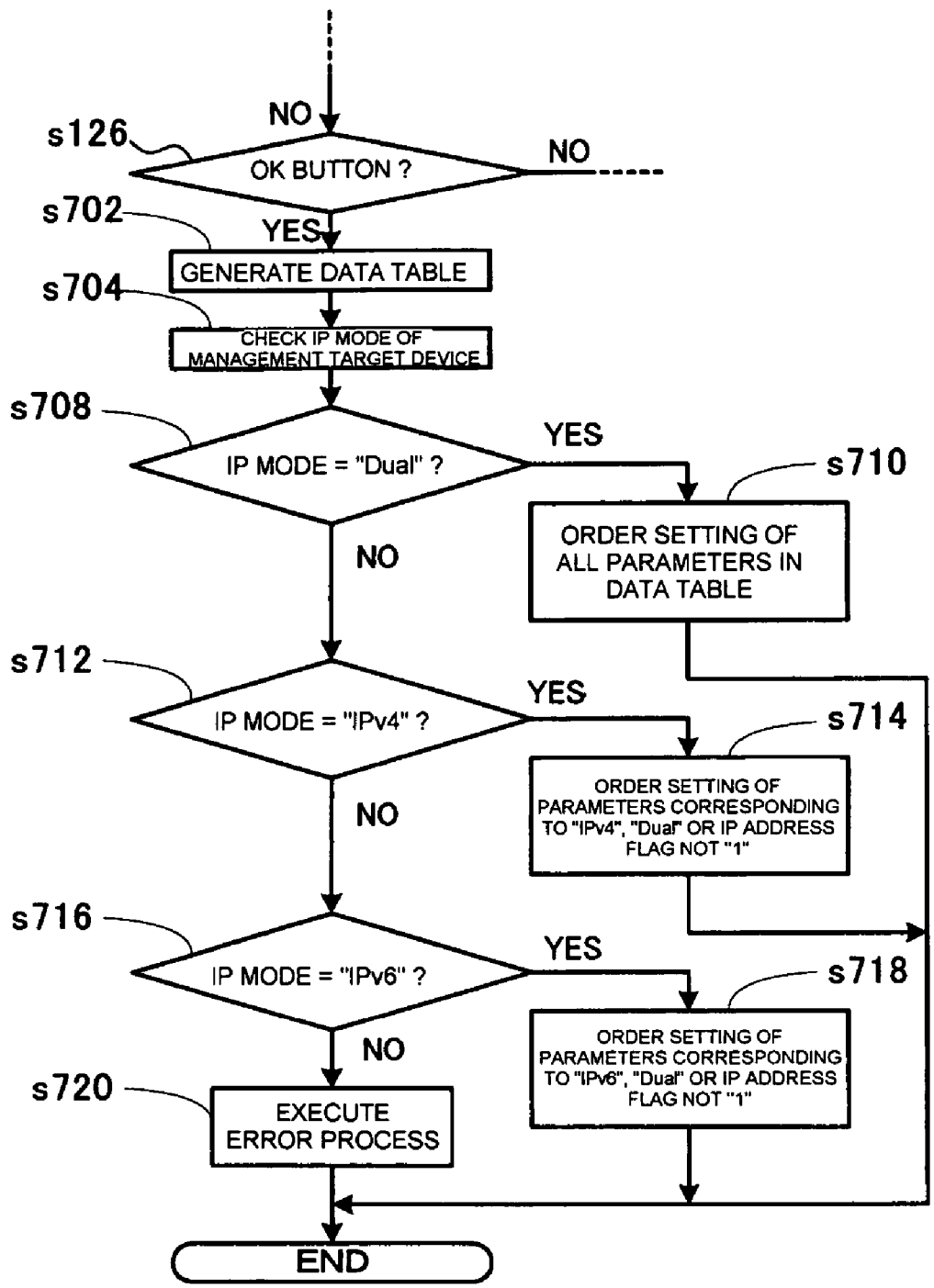
FIG. 24 is a flowchart showing a modification of step S128 of the manual setting process of FIG. 2 according to illustrative aspects of the invention.

Referring to FIG. 24, when the judgment in the step S126 is "YES", the PC 10_1 generates a data table regarding each of the usage parameters entered in the input windows on all the subscreens of the setting screen (S702). In the data table, a "setting target IP mode" (indicating whether each usage parameter is for IPv4, for IPv6, or supported by both IPv4/IPv6) and an "IP address flag" (indicating whether each usage parameter indicates an IP address (set to "1" when the parameter indicates an IP address)) are registered while being associated with each usage parameter.

Subsequently, the PC 10_1 checks the IP mode of the management target device (S704). In this step, the PC 10_1 transmits inquiry data (inquiring about the IP mode) to the management target device. Since notification data (indicating the IP mode of the management target device) is sent back from the management target device receiving the inquiry data, the IP mode indicated by the notification data is recognized by the PC 10_1 as the IP mode of the management target device. Incidentally, the check on the IP mode can also be executed by inquiring about the IP mode together with other information in the inquiry of the step S110 of FIG. 2.

After the IP mode of the management target device is determined as above, the PC 10_1 transmits setting instruction data, ordering the setting of usage parameters corresponding to the IP mode determined in the step S704 (out of all the usage parameters registered in the data table), to the management target device.

Specifically, if the IP mode of the management target device is "Dual" (S708: YES), setting instruction data, ordering the setting of all the parameters registered in the data table, is transmitted to the management target device so that all the parameters will be set to (incorporated into) the management target device (S710).

If the IP mode of the management target device is "IPv4" (S708: NO, S712: YES), setting instruction data, ordering the setting of each parameter (registered in the data table) whose "setting target IP mode" is "IPv4" or "Dual" or whose "IP address flag" is not "1" (not indicating an IP address), is transmitted to the management target device so that such parameters will be set to (incorporated into) the management target device (S714).

If the IP mode of the management target device is "IPv6" (S712: NO, S716: YES), setting instruction data, ordering the setting of each parameter (registered in the data table) whose "setting target IP mode" is "IPv6" or "Dual" or whose "IP address flag" is not "1" (not indicating an IP address), is transmitted to the management target device so that such usage parameters will be set to (incorporated into) the management target device (S718). If the IP mode of the management target device is none of the above modes (S716: NO), an error process for dealing with the situation is executed (S720).

While the management target device is instructed by the setting instruction to set all the usage parameters entered in the input windows on all the subscreens of the setting screen in the step S128 of FIG. 2 and thereby sets all the usage parameters designated by the setting instruction in the above illustrative embodiments, the management target device may also be configured to set part of the usage parameters (designated by the setting instruction) corresponding to the IP mode(s) that the management target device has been configured to be able to support. For this purpose, the setting instruction (step S128 of FIG. 2) is issued by the PC 10_1 so as to order the setting of each usage parameter while associating each usage parameter with the "setting target IP mode" and the "IP address flag" similarly to the data table generated in the step S702 of FIG. 24, and the management target device receiving the setting instruction executes a setting incorporation process shown in FIG. 25, for example.

Figure 25:
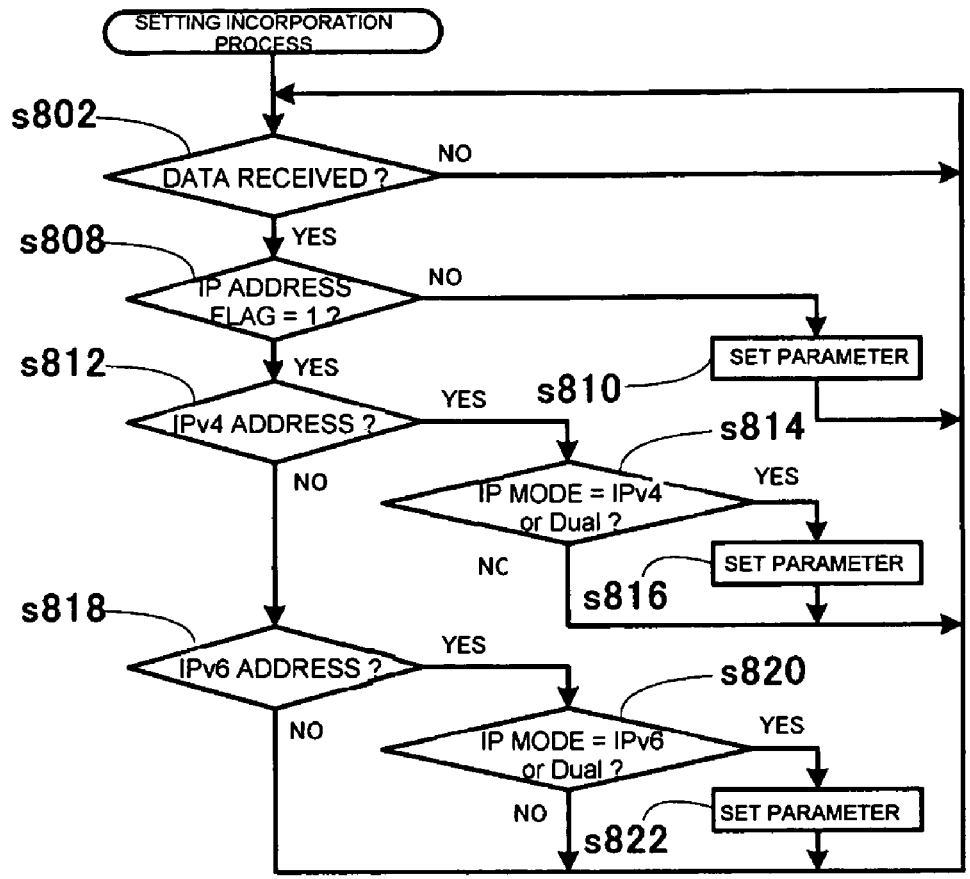
FIG. 25 is a flowchart showing a setting incorporation process which can be executed by each printer according to illustrative aspects of the invention.

Incidentally, the setting incorporation process of FIG. 25 shows a simple case where the setting instruction designates setting only one usage parameter. When the setting instruction designates setting two or more usage parameters, the process from step S808 of FIG. 25 is repeated for the usage parameters. Referring to FIG. 25, the management target device first waits until setting instruction data is received (S802). When setting instruction data is received (S802: YES), the management target device checks whether the "IP address flag" associated with a usage parameter included in the setting instruction data is "1" (S808). If the "IP address flag" is not "1", that is, if the usage parameter does not indicate an IP address (S808: NO), the management target device incorporates the usage parameter into its settings (sets the usage parameter to itself) (S810).

If the "IP address flag" associated with the usage parameter included in the setting instruction data is "1", that is, if the usage parameter indicates an IP address (S808: YES), the management target device checks whether the usage parameter indicating an IP address is a character string of the IPv4 format (S812). If the usage parameter (IP address) is in the IPv4format (S812: YES), the management target device incorporates the usage parameter into its settings (sets the usage parameter to itself) (S816) if the IP mode of the management target device has been set to "IPv4" or "Dual" (S814: YES). Thereafter, the management target device returns to the step S802. In other words, in the case where data received via the network is setting instruction data designating setting an IPv4 address (S812: YES), the management target device returns to the step S802 without incorporating the usage parameter (IPv4 address) into its settings if the IP mode of the management target device has not been set to "IPv4" or "Dual" (S814: NO).

If the usage parameter is not in the IPv4 format (S812: NO), the management target device checks whether the usage parameter indicating an IP address is a character string of the IPv6 format (S818). If the usage parameter (IP address) is in the IPv6 format (S818: YES), the management target device incorporates the usage parameter into its settings (S822) if the IP mode of the management target device itself has been set to "IPv6" or "Dual" (S820: YES). Thereafter, the process returns to the step S802. In other words, in the case where data received via the network is setting instruction data designating setting an IPv6 address (S818: YES), the management target device returns to the step S802 without incorporating the usage parameter (IPv6 address) into its settings if the IP mode of the management target device has not been set to "IPv6" or "Dual" (S820: NO).

What is claimed is:

1. A non-transitory computer readable storage medium having a program stored thereon, the program being executable by a management device capable of managing a communication setting of a management target device connected to the management device via a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein executing the program causes the management device to execute functions including:
a display unit displaying a first screen which allows input by a user of the network communication address of the management target device, and a second screen which allows a determination of the setting method for setting the network communication address of the management target device;
an address setting unit setting the network communication address inputted by the user on the first screen displayed by the display unit to the management target device, the network communication address being inputted irrespective of whether the second setting method determined on the second screen is enabled or disabled;
a method selection unit selecting whether to enable or disable the second setting method based on user interaction with the second screen displayed by the display unit;
a method setting unit setting the setting method of the management target device so that the management target device can communicate with the at least one other communication device in accordance with the setting method determined based on the selection by the method selection unit; and
a setting method changing unit causing, when the second setting method is enabled, the method setting unit to set the second setting method to a disabled state in response to the input of the network communication address by the user with the address setting unit, even when the setting method is not manually changed by the user on the second screen with the method setting unit.

2. The computer readable medium according to claim 1, wherein the program further causes the management device to execute a function of
providing a notification that, when the second setting method is enabled, the second setting method should be disabled, or that the first setting method should be enabled.

3. The computer readable medium according to claim 2, wherein:
the second setting method includes obtaining a network communication address for the management target device from a source device connected to the management target device via the network, and
the program further causes the management device to execute a function of
providing a notification that the second setting method is to be enabled.

4. A non-transitory computer readable storage medium having a program stored thereon, the program being executable by a management device capable of managing a communication setting of a management target device connected to the management device via a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein executing the program causes the management device to execute functions including:
a display unit displaying a first screen which allows designation of the network communication address which has been set to the management target device, and a second screen which allows a determination of the setting method for setting the network communication address of the management target device;
an address setting unit deleting the network communication address designated by a user through the first screen displayed by the display unit from the management target device, the network communication address designated by the user being deleted irrespective of the second setting method determined on the second screen being enabled or disabled;
a method selection unit selecting whether to enable or disable the second setting method based on user interaction on the second screen displayed by the display unit;
a method setting unit setting the setting method of the management target device so that the management target device can communicate with the at least one other communication device in accordance with the setting method determined based on the selection by the method selection unit; and
a setting method changing unit causing, when the second setting method is enabled, the method setting unit to set the second setting method to be disabled in response to the deletion of the user designated network communication address set by the second setting method, even when the setting method is not manually changed by the user on the second screen with the method setting unit, and when the second setting method is disabled, causing the method setting unit to set the second setting method to be enabled in response to the deletion of the user designated network communication address set by the first setting method, even when the setting method is not manually changed by the user on the second screen with the method setting unit.

5. The computer readable medium according to claim 4, wherein the program further causes the management device to execute a function of
providing a notification that the setting method of the designated network communication address should be disabled, or that a setting method for setting a network communication address other than the setting method of the designated network communication address should be enabled.

6. The computer readable medium according to claim 5, wherein the program further causes the management device to execute a function of determining whether to enable or disable the setting method for setting a network communication address similar to the setting method of the designated network communication address.

7. The computer readable medium according to claim 5, wherein:
the second setting method includes obtaining the designated network communication address from another device connected via the network, and
the program further causes the management device to execute a function of
providing a notification that the second setting method, through which the designated network communication address is obtained from the other device, is to be disabled.

8. The computer readable medium according to claim 4, wherein the designated network communication address of the management target device includes a parameter indicating all or part of identification information assigned to a device connected to the network.

9. The computer readable medium according to claim 4, wherein the second setting method includes stateful and stateless settings.

10. The computer readable medium according to claim 4, wherein the program further causes the management device to execute functions including:
determining whether the designated network communication address is an appropriate network communication address, and
determining that the setting method is to be changed only when the designated network communication address is determined to be an appropriate network communication address.

11. The computer readable medium according to claim 4, wherein the program further causes the management device to execute a function of
changing the designated network communication address together with a state of the setting method when the user selects to change the state of the setting method, while only changing the designated network communication address when the user does not change the state of the setting method.

12. The computer readable medium according to claim 11, wherein:
the setting method includes a method configured to set a plurality of network communication addresses of the management target device, and
the program further causes the management device to execute a function of
allowing the user to select whether to change the state of the setting method when no other network communication address has been set for the management target device by the setting method of the designated network communication address, while not permitting selection by the user when another network communication address has already been set for the management target device by the setting method of the designated network communication address,
wherein the designated network communication address is only changed when selection by the user is not permitted.

13. The computer readable medium according to claim 11, wherein the program further causes the management device to execute a function of
determining whether to permit setting of network communication addresses by each of the first and second setting methods responsive to receiving a user input,
wherein
the designated network communication address is only changed when setting of network communication addresses by the setting method of the designated network communication address is determined to not be permitted.

14. The computer readable medium according to claim 13, wherein:
information indicating the determination of whether to permit setting of network communication addresses by each of the first and second setting methods is stored in a storage unit of the management target device as setting permission information, and
permitting the user to select whether to change the state of one or more of the first and second setting methods when the setting permission information read out from the storage unit of the management target device indicates permission for the setting of network communication addresses by the one or more of the first and second setting methods.

15. The computer readable medium according to claim 11, wherein the program further causes the management device to execute a function of restricting the changing of the designated network communication address when a setting for restricting the designated network communication address from being changed has been made.

16. The computer readable medium according to claim 15, wherein the program further causes the management device to execute functions including:
determining that the designated network communication address is to be restricted from changing responsive to receiving a user input, and
restricting the designated network communication address from being changed when the designated network communication address is determined to be restricted from changing.

17. The computer readable medium according to claim 16, wherein:
information indicating the determination that the designated network communication address is to be restricted from changing is stored in a storage unit of the management target device as change restriction information, and
the changing of the designated network communication address is restricted when the change restriction information read out from the storage unit of the management target device indicates the restriction of the designated network communication address from being changed.

18. The computer readable medium according to claim 11, wherein the program further causes the management device to execute a function of restricting the designated network communication address from being changed when the designated network communication address has been set by a particular setting method.

19. The computer readable medium according to claim 18, wherein the program further causes the management device to execute a function of
determining the particular setting method regarding the restriction of the designated network communication address from being changed responsive to receiving a user input.

20. The computer readable medium according to claim 19, wherein:
information specifying the particular setting method determined in regards to the restriction of the designated network communication address from being changed is stored in a storage unit of the management target device as change restriction information, and
the designated communication address is restricted from being changed when the change restriction information read out from the storage unit of the management target device indicates that the particular setting method is associated with the designated network communication address.

21. The computer readable medium according to claim 4, wherein the program further causes the management device to execute functions including:
determining whether a stoppage condition for stopping data communication by the management target device is satisfied when the designated network communication address is designated for deletion, and
providing a notification that a parameter indicating whether to allow the management target device to perform data communication is to be changed to a parameter indicating stoppage of the data communication when the stoppage condition is determined to be satisfied.

22. The computer readable medium according to claim 21, wherein the stoppage condition is satisfied when the designated network communication address designated for deletion is one of one or more communication addresses indispensable for the management target device to perform data communication.

23. The computer readable medium according to claim 21, wherein the stoppage condition is satisfied when no network communication address other than the designated network communication address has been set for the management target device.

24. The computer readable medium according to claim 21, wherein the program further causes the management device to execute a function of determining whether to permit the changing of the parameter indicating whether to allow the management target device to perform data communication responsive to receiving a user input,
wherein the stoppage condition is satisfied when the changing of the parameter indicating whether to permit the management target device to perform data communication is determined to be permitted.

25. The computer readable medium according to claim 24, wherein:
information indicating the determination of whether to permit the changing of the parameter indicating whether to allow the management target device to perform data communication responsive to receiving user input is stored in a storage unit of the management target device as change permission information, and
the stoppage condition is satisfied when the change permission information read out from the storage unit of the management target device indicates permission for the changing of the parameter indicating whether to permit the management target device to perform the data communication.

26. A setting management system configured to manage a communication setting of a management target device connected to a management device via a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein the setting management system comprises:
a display unit configured to display a first screen which allows input by a user of the network communication address of the management target device, and a second screen which allows a determination of the setting method for setting the network communication address of the management target device;
an address setting unit configured to set the network communication address inputted by the user on the first screen displayed by the display unit to the management target device, the network communication address being inputted irrespective of whether the second setting method determined on the second screen is enabled or disabled;
a method selection unit configured to select whether to enable or disable the second setting method based on user interaction with the second screen displayed by the display unit;
a method setting unit configured to set the setting method of the management target device so that the management target device can communicate with the at least one other communication device in accordance with the setting method determined based on the selection by the method selection unit; and
a setting method changing unit configured to cause, when the second setting method is enabled, the method setting unit to set the second setting method to a disabled state in response to the input of the network communication address by the user with the address setting unit, even when the setting method is not manually changed by the user on the second screen with the method setting unit.

27. A setting management system configured to manage a communication setting of a management target device connected to a management device via a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein the setting management system comprises:
a display unit configured to display a first screen which allows designation of the network communication address which has been set to the management target device, and a second screen which allows a determination of the setting method for setting the network communication address of the management target device;
an address setting unit configured to delete the network communication address designated by a user through the first screen displayed by the display unit from the management target device, the network communication address designated by the user being deleted irrespective of the second setting method determined on the second screen being enabled or disabled;

a method selection unit configured to select whether to enable or disable the second setting method based on user interaction on the second screen displayed by the display unit;

a method setting unit configured to set the setting method of the management target device so that the management target device can communicate with the at least one other communication device in accordance with the setting method determined based on the selection by the method selection unit; and a setting method changing unit configured to cause, when the second setting method is enabled, the method setting unit to set the second setting method to be disabled in response to the deletion of the user designated network communication address set by the second setting method, even when the setting method is not manually changed by the user on the second screen with the method setting unit, and when the second setting method is disabled, to cause the method setting unit to set the second setting method to be enabled in response to the deletion of the user designated network communication address set by the first setting method, even when the setting method is not manually changed by the user on the second screen with the method setting unit.

28. A setting management method for managing a communication setting of a management target device in a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein the setting management method comprising steps of:

displaying a first screen which allows input by a user of the network communication address of the management target device, and a second screen which allows a determination of the setting method for setting the network communication address of the management target device;

setting the network communication address inputted by the user on the first screen displayed in the displaying step to the management target device, the network communication address being inputted irrespective of whether the second setting method determined on the second screen is enabled or disabled;

selecting whether to enable or disable the second setting method based on user interaction with the second screen displayed in the displaying step;

setting the setting method of the management target device so that the management target device can communicate with the at least one other communication device in accordance with the setting method determined based on the selection in the selecting step; and when the second setting method is enabled, setting the second setting method to a disabled state in response to the input of the network communication address by the user in the setting step, even when the setting method is not manually changed by the user on the second screen.

29. A setting management method for managing a communication setting of a management target device in a network, wherein the communication setting includes at least a network communication address necessary for the management target device to perform data communication with at least one other communication device via the network and for specifying the management target device on the network, and a setting method indicating how the network communication address is to be set, the setting method including at least a first setting method which sets the network communication address manually by a user operation, and a second setting method which sets the network communication address automatically without the user operation, the communication setting being settable by the user operation, wherein the setting management method comprising steps of:

displaying a first screen which allows designation of the network communication address which has been set to the management target device, and a second screen which allows a determination of the setting method for setting the network communication address of the management target device;

deleting the network communication address designated by a user through the first screen displayed in the displaying step from the management target device, the network communication address designated by the user being deleted irrespective of the second setting method determined on the second screen being enabled or disabled;

selecting whether to enable or disable the second setting method based on user interaction on the second screen displayed in the displaying step;

setting the setting method of the management target device so that the management target device can communicate with the at least one other communication device in accordance with the setting method determined based on the selection in the selecting step; and when the second setting method is enabled, setting the second setting method to be disabled in response to the deletion of the user designated network communication address set by the second setting method, even when the setting method is not manually changed by the user on the second screen, and when the second setting method is disabled, setting the second setting method to be enabled in response to the deletion of the user designated network communication address set by the first setting method, even when the setting method is not manually changed by the user on the second screen.

* * * * *